United States Patent
Nakano

(10) Patent No.: US 8,111,374 B2
(45) Date of Patent: Feb. 7, 2012

(54) ANALYSIS METHOD, EXPOSURE METHOD, AND DEVICE MANUFACTURING METHOD

(75) Inventor: Katsushi Nakano, Kumagaya (JP)

(73) Assignee: Nikon Corporation, Tokyo (JP)

( * ) Notice: Subject to any disclaimer, the term of this patent is extended or adjusted under 35 U.S.C. 154(b) by 362 days.

(21) Appl. No.: 11/517,285

(22) Filed: Sep. 8, 2006

(65) Prior Publication Data

US 2007/0058148 A1    Mar. 15, 2007

Related U.S. Application Data

(60) Provisional application No. 60/819,377, filed on Jul. 10, 2006.

(30) Foreign Application Priority Data

Sep. 9, 2005    (JP) ................................. 2005-261887

(51) Int. Cl.
*G03B 27/42*    (2006.01)
(52) U.S. Cl. ............................................ 355/53; 355/30
(58) Field of Classification Search .................... 355/53, 355/30
See application file for complete search history.

(56) References Cited

U.S. PATENT DOCUMENTS

| | | |
|---|---|---|
| 4,346,164 A | 8/1982 | Tabarelli et al. |
| 4,480,910 A | 11/1984 | Takanashi et al. |
| 5,610,683 A | 3/1997 | Takahashi |
| 5,715,039 A | 2/1998 | Fukuda et al. |
| 5,825,043 A | 10/1998 | Suwa |
| 5,969,441 A | 10/1999 | Loopstra et al. |
| 6,020,964 A | 2/2000 | Loopstra et al. |
| 6,137,570 A | 10/2000 | Chuang et al. |
| 6,208,407 B1 | 3/2001 | Loopstra |
| 6,590,634 B1 | 7/2003 | Nishi et al. |
| 6,611,316 B2 | 8/2003 | Sewell |
| 6,721,034 B1 | 4/2004 | Horikawa |
| 6,778,257 B2 | 8/2004 | Bleeker et al. |
| 6,897,963 B1 | 5/2005 | Taniguchi et al. |
| 7,116,395 B2 * | 10/2006 | Nakamura ..................... 355/30 |
| 2002/0037462 A1 * | 3/2002 | Ogata et al. .................... 430/30 |
| 2004/0165159 A1 | 8/2004 | Lof et al. |
| 2005/0037272 A1 * | 2/2005 | Tanaka .......................... 430/30 |
| 2005/0206868 A1 | 9/2005 | Kruijswijk et al. |
| 2005/0237504 A1 | 10/2005 | Nagasaka et al. |

(Continued)

FOREIGN PATENT DOCUMENTS

DE        DD 221 563 A1    4/1985

(Continued)

OTHER PUBLICATIONS

Translation of JP2001167996A is attached.*

(Continued)

*Primary Examiner* — Edward Glick
*Assistant Examiner* — Mesfin T Asfaw
(74) *Attorney, Agent, or Firm* — Oliff & Berridge, PLC

(57) ABSTRACT

An analysis method includes a developing process (SA60), which develops the substrate, a first measuring process (SA50), which measures the abnormalities of the pre-development substrate, a second measuring process (SA70), which measures the abnormalities of the post-development substrate, and an analyzing process (SA80), which analyzes the exposure defects of a substrate exposed via a liquid based on the measurements results of the first measuring process (SA50) and the measurement results of the second measuring process (SA70).

16 Claims, 19 Drawing Sheets

U.S. PATENT DOCUMENTS

| | | |
|---|---|---|
| 2006/0098177 A1 | 5/2006 | Nagasaka |
| 2006/0110945 A1 | 5/2006 | Ho et al. |
| 2006/0177777 A1 | 8/2006 | Kawamura et al. |
| 2006/0192930 A1 | 8/2006 | Iimura et al. |
| 2006/0201423 A1 | 9/2006 | Akimoto et al. |
| 2006/0251986 A1* | 11/2006 | Sato et al. .................. 430/270.1 |

FOREIGN PATENT DOCUMENTS

| | | |
|---|---|---|
| DE | DD 224 448 A1 | 7/1985 |
| EP | 1 416 328 A2 | 5/2004 |
| EP | 1 571 698 A1 | 9/2005 |
| EP | 1 632 991 A1 | 3/2006 |
| JP | A 58-202448 | 11/1983 |
| JP | A 59-19912 | 2/1984 |
| JP | A 62-65326 | 3/1987 |
| JP | A 63-157419 | 6/1988 |
| JP | A 4-305915 | 10/1992 |
| JP | A 4-305917 | 10/1992 |
| JP | A 5-62877 | 3/1993 |
| JP | A 6-124873 | 5/1994 |
| JP | A 7-220990 | 8/1995 |
| JP | A 8-130179 | 5/1996 |
| JP | A 8-316125 | 11/1996 |
| JP | A-8-316125 | 11/1996 |
| JP | A 10-163099 | 6/1998 |
| JP | A 10-214783 | 8/1998 |
| JP | A 10-303114 | 11/1998 |
| JP | A 10-340846 | 12/1998 |
| JP | A 11-135400 | 5/1999 |
| JP | A 11-176727 | 7/1999 |
| JP | A 2000-58436 | 2/2000 |
| JP | A 2000-505958 | 5/2000 |
| JP | A 2000-164504 | 6/2000 |
| JP | 2001167996 A * | 6/2001 |
| JP | A 2001-510577 | 7/2001 |
| JP | A 2002-519667 | 7/2002 |
| JP | A-2003-270117 | 9/2003 |
| JP | A-2004-200680 | 7/2004 |
| JP | A 2004-519850 | 7/2004 |
| JP | A-2005-142576 | 6/2005 |
| JP | A-2005-286286 | 10/2005 |
| JP | A-2006-222284 | 8/2006 |
| JP | A-2006-243264 | 9/2006 |
| JP | A-2006-253501 | 9/2006 |
| WO | WO 99/23692 | 5/1999 |
| WO | WO 99/28790 | 6/1999 |
| WO | WO 99/49504 | 9/1999 |
| WO | WO 00/00817 | 1/2000 |
| WO | WO 01/35168 A1 | 5/2001 |
| WO | WO 02/069049 A2 | 9/2002 |
| WO | WO 03/077291 A1 | 9/2003 |
| WO | WO 2004/019128 A2 | 3/2004 |
| WO | WO 2004/105106 A1 | 12/2004 |
| WO | WO 2006/091523 A2 | 8/2006 |
| WO | WO 2007/143449 A2 | 12/2007 |

OTHER PUBLICATIONS

Nov. 14, 2006 Written Opinion in International Application No. PCT/JP2006/317901, with translation.

Nov. 14, 2006 International Search Report in International Application No. PCT/JP2006/317901, with translation.

Oct. 25, 2011 Office Action in Japanese Patent Application No. 2007-534489 (with English translation).

* cited by examiner

[PRE-DEVELOPMENT MEASUREMENT RESULTS]

[POST-DEVELOPMENT MEASUREMENT RESULTS]

[PRE-DEVELOPMENT MEASUREMENT RESULTS]

[POST-DEVELOPMENT MEASUREMENT RESULTS]

ANALYSIS METHOD, EXPOSURE METHOD, AND DEVICE MANUFACTURING METHOD

CROSS-REFERENCE TO RELATED APPLICATION

This application is a non-provisional application claiming benefit of provisional application No. 60/819,377, filed Jul. 10, 2006, and claims priority to Japanese Patent Application No. 2005-261887, filed Sep. 9, 2005, the contents of which are incorporated herein by reference.

BACKGROUND OF THE INVENTION

1. Field of the Invention

The present invention relates to an analysis method that analyzes exposure defects of a substrate exposed via a liquid, an exposure method, and a device manufacturing method.

2. Description of Related Art

For exposure apparatuses used in photolithography processes, liquid immersion exposure apparatuses that expose a substrate via a liquid, such as that disclosed in PCT International Publication WO 99/49504, have been devised.

In the case where an exposure defect has occurred in a substrate exposed with using the liquid immersion method, it is important to, for example, identify the cause of the exposure defect and take appropriate measure. For this reason, it is desirable that a method of accurately analyzing the exposure defects of a substrate exposed with using the liquid immersion method be devised.

SUMMARY OF THE INVENTION

An object of the present invention is to provide an analysis method that analyzes the exposure defects of a substrate exposed with using the liquid immersion method. In addition, another object is to provide an exposure method that analyzes the status of the substrate using that analysis method and exposes the substrate and a device manufacturing method that uses that exposure method.

According to a first aspect of the present invention, an analysis method is provided that analyzes the exposure defects of a substrate exposed via a liquid, where the analysis method includes a developing process, which develops the substrate, a first measuring process, which measures the abnormalities of the pre-development substrate, a second measuring process, which measures the abnormalities of the post-development substrate, and an analyzing process, which analyzes the exposure defects of the substrate exposed via the liquid based on the measurement results of the first measuring process and the measurement results of the second measuring process.

According to the first aspect of the present invention it is possible to accurately analyze the exposure defects of the substrate exposed via a liquid.

According to a second aspect of the present invention is followed, an exposure method is provided that exposes a substrate via a liquid; wherein is has a process that analyzes the status of the substrate by means of an analysis method of the above aspect.

According to the second aspect of the present invention, it is possible to expose a substrate well using the results of having analyzed the exposure defects of the substrate.

According to a third aspect of the present invention, an exposure method is provided that exposes a substrate via a liquid; wherein it obtains the relationship between the receding contact angle of the liquid on the film that forms the uppermost layer of the substrate prior to exposure of the substrate and the defect level of the post-exposure substrate.

According to the third aspect of the present invention, it is possible to expose a substrate well using the relationship between the receding contact angle of the liquid and the defect level of the post-exposure substrate.

According to a fourth aspect of the present invention, a device manufacturing method is provided that uses an exposure method of an above aspect.

According to the fourth aspect of the present invention, it is possible to manufacture a device using an exposure method that is able to expose a substrate well.

DETAILED DESCRIPTION OF THE INVENTION

Below, embodiments of the present invention will be explained while referring to drawings, but the present invention is not limited by these.

First Embodiment

Figure 1:
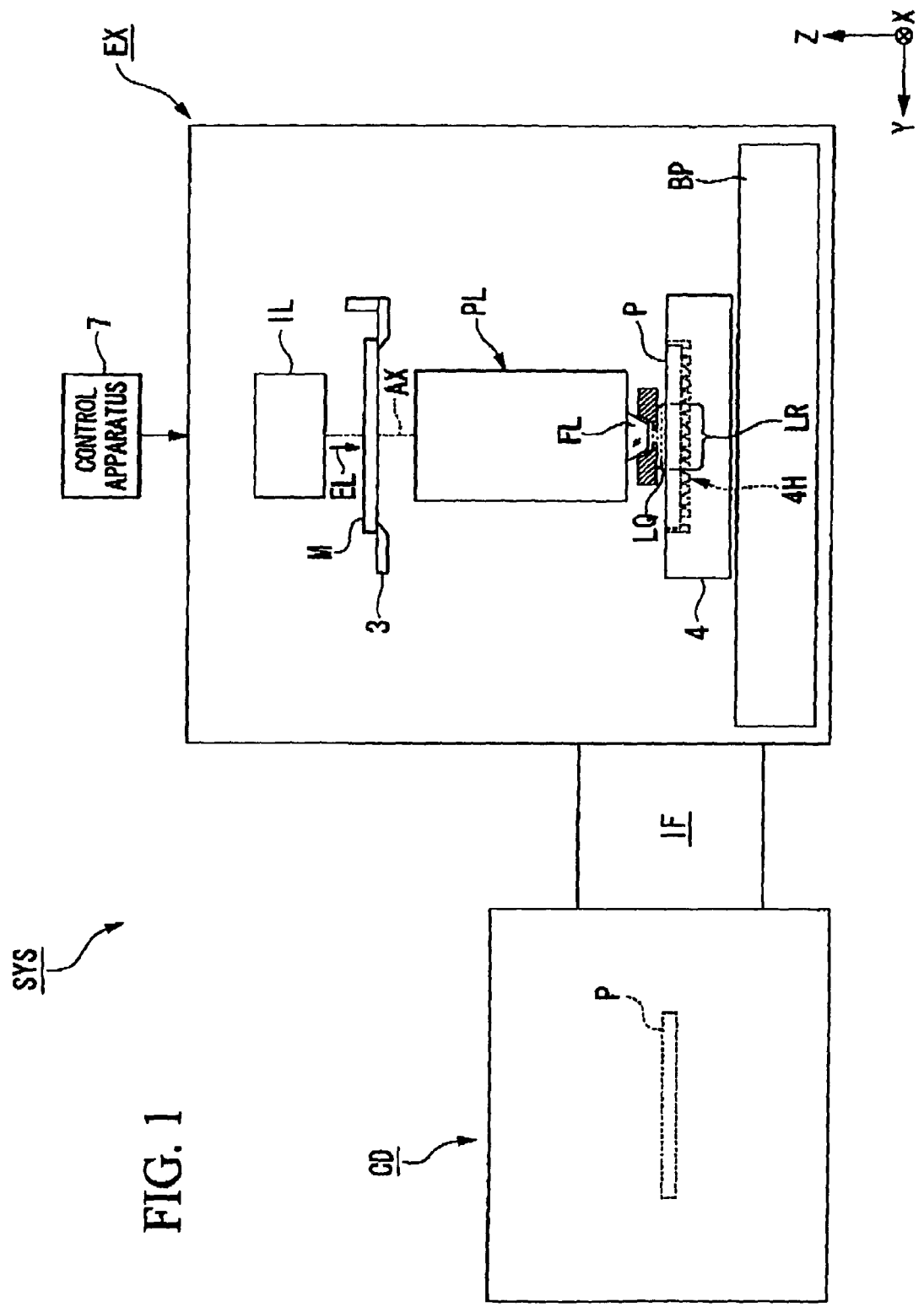
FIG. 1 is a schematic block diagram that shows a device manufacturing system comprising an exposure apparatus relating to the first embodiment.

The first embodiment will be explained. FIG. 1 is a drawing that shows a device manufacturing system SYS comprising an exposure apparatus EX relating to the first embodiment. In FIG. 1, the device manufacturing system SYS comprises an exposure apparatus EX and a coater/developer apparatus CD connected to the exposure apparatus EX.

The exposure apparatus EX comprises a mask stage 3, which holds a mask M and is able to move, a substrate stage 4, which has a substrate holder 4H that holds the substrate P and which holds a substrate P on the substrate holder 4H and is able to move, an illumination optical system IL, which uses exposure light EL to illuminate the mask M held by the mask stage 3, a projection optical system PL, which projects the pattern image of the mask M illuminated by the exposure light EL onto the substrate P, and a control apparatus 7, which controls movement of the entire exposure apparatus EX.

In the present embodiment, the case in which a scanning type exposure apparatus (a so-called scanning stepper) that exposes a pattern formed on the mask M while synchronously moving the mask M and the substrate P in the scanning direction is used as the exposure apparatus EX will be explained as an example. In the following explanation, the synchronous movement direction (scanning direction) of the mask M and the substrate P in the horizontal plane is the Y axis direction, the direction perpendicular to the Y axis direction within the horizontal plane is the X axis direction (non-scanning direction), and the direction parallel to the optical axis AX of the projection optical system PL and perpendicular to the X axis and Y axis directions is the Z axis direction. In addition, the directions of rotation (inclination) about the X axis, the Y axis and the Z axis are considered to be the θX, θY and θZ directions respectively.

The exposure apparatus EX of the present embodiment is a liquid immersion exposure apparatus that applies the liquid immersion method to effectively shorten the exposure wavelength to improve resolution while effectively broadening the depth of focus. In the exposure apparatus EX, a liquid immersion region LR of the liquid LQ is formed on the substrate P held by a substrate stage 4, and the substrate P is exposed by irradiating exposure light EL onto the substrate P via the liquid LQ of the liquid immersion region LR. In the present embodiment, water (pure water) is used as the liquid LQ.

The coater/developer apparatus CD includes a coating apparatus, which coats a prescribed film onto the base material of the pre-exposure processing substrate P, and a developer apparatus, which develops the post-exposure processing substrate P. The exposure apparatus EX and the coater/developer apparatus CD are connected via an interface IF. The substrate P can be conveyed between the exposure apparatus EX and the coater/developer apparatus CD via an interface IF by means of a conveyance apparatus that is not shown in the drawing.

Figure 2:
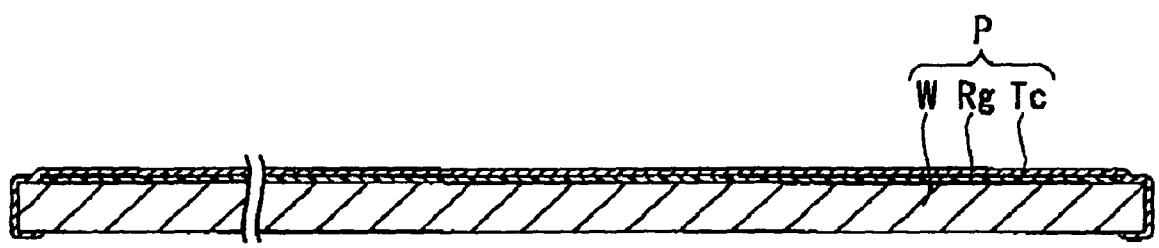
FIG. 2 is a cross-sectional view that schematically shows an example of the substrate.

FIG. 2 is a drawing that shows an example of the substrate P that includes a base material on which a prescribed film has been coated by means of the coating apparatus of the coater/developer apparatus CD. In FIG. 2, the substrate P has a base material W such as a semiconductor wafer, a first film Rg coated onto that base material W, and a second film Tc coated onto that first film Rg. The first film Rg is a film comprising a photosensitive material (photoresist). The second film Tc is a film called the topcoat film, and, for example, it has such functions as protecting the first film Rg comprising a photosensitive material and the base material W from the liquid LQ, and it has lyophilicity (hydrophilicity) with respect to the liquid LQ. By providing the second film Tc, which is a lyophilic film, it is also possible to increase liquid LQ recoverability. The first film Rg is formed by coating a photosensitive material (photoresist) onto a base material W by means of the spin coating method for example. Similarly, the second film Tc is also formed by coating a material for forming the topcoat film. The liquid immersion region LR of the liquid LQ is formed on the second film Tc of the substrate P, so, of the substrate P, the second film Tc forms a liquid contact surface, which comes in contact with the liquid LQ of the liquid immersion region LR.

Figure 3:
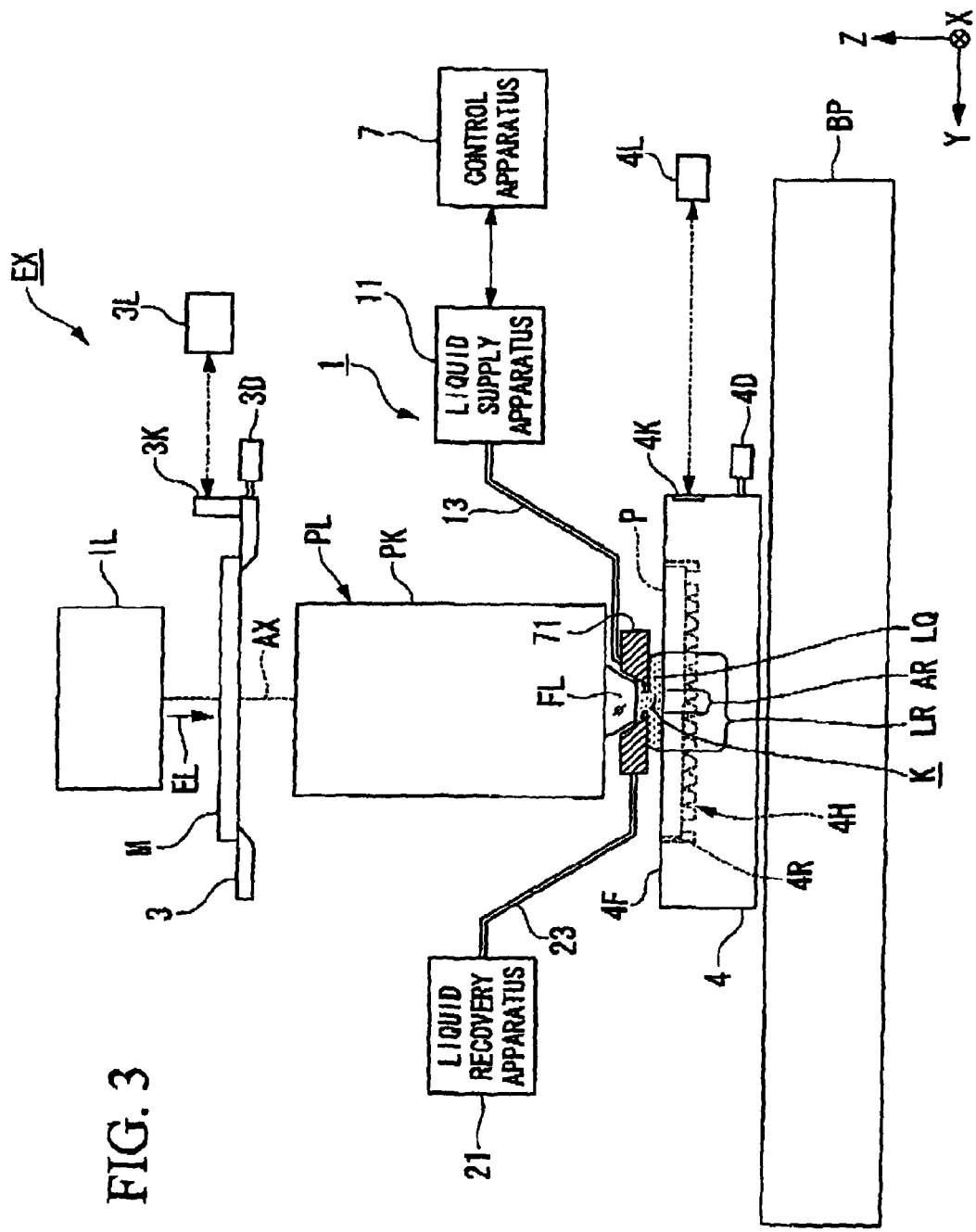
FIG. 3 is a schematic block diagram that shows an exposure apparatus relating to the first embodiment.

Next, the exposure apparatus EX will be explained while referring to FIG. 3. FIG. 3 is a schematic block diagram that shows an exposure apparatus EX relating to the present embodiment. The exposure apparatus EX comprises a liquid immersion system 1 that fills the optical path space K of the exposure light EL in the vicinity of the image plane of the projection optical system PL with a liquid LQ to form a liquid immersion region LR. The operation of the liquid immersion system 1 is controlled by a control apparatus 7. The liquid immersion system 1 forms the liquid immersion region LR on the substrate P so that the optical path space K of the exposure light EL between the lower surface of a final optical element FL, which is nearest the image plane of the projection optical system PL, and the surface of the substrate P on the substrate holder 4H arranged on the image plane side of the projection optical system PL is filled with the liquid LQ.

The exposure apparats EX uses a liquid immersion system 1 to fill the optical path space K of the exposure light EL with the liquid LQ at least while the pattern image of the mask M is being projected onto the substrate P. The exposure apparatus EX projects the pattern image of the mask M onto the substrate P to expose the substrate P by irradiating exposure light EL that has passed through the mask M via the projection optical system PL and the liquid LQ that has been filled into the optical path space K of the exposure light EL. In addition, the exposure apparatus EX of the present embodiment employs a local liquid immersion system in which the liquid LQ that has been filled into the optical path space K of the exposure light EL between the final optical element FL and the substrate P locally forms, in a region of part of the substrate P that includes a projection region AR of the projection optical system PL, a liquid LQ liquid immersion region LR that is larger than a projection region AR and smaller than the substrate P.

Note that the liquid immersion region LR can be formed not only on the substrate P but also on an object arranged at a position that opposes the lower surface of the final optical element FL, for example a portion of the substrate stage 4, at the image plane side of the projection optical system PL.

The illumination optical system IL illuminates a prescribed illumination region on the mask M using exposure light EL with a uniform intensity distribution. For the exposure light EL that emerges from the illumination optical system IL, for example, deep ultraviolet light (DUV light) such as bright lines (g-rays, h-rays, i-rays) that emerge from a mercury lamp and KrF excimer laser light (wavelength of 248 nm) or vacuum ultraviolet light (VUV light) such as ArF excimer laser light (wavelength of 193 nm) and $F_2$ laser light (wavelength of 157 nm) are used. In the present embodiment, ArF excimer laser light is used.

A mask stage 3 is able to move in the X axis, Y axis, and θZ directions in a status in which the mask M is held by means of the driving of a mask stage drive apparatus 3D that includes an actuator such as a linear motor. The position information of the mask stage 3 (and, in turn, the mask M) is measured by a laser interferometer 3L. The laser interferometer 3L measures the position information of the mask stage 3 using a movable mirror 3K provided on the mask stage 3. A control apparatus 7 drives the mask stage drive apparatus 3D and performs positional control of the mask M held by the mask stage 3 based on the measurement results of the laser interferometer 3L. Note that the mask discussed here includes a reticle that has formed a device pattern that is reduction projected onto a substrate. In addition, in the present embodiment, a transmission type mask is used as the mask, but a reflecting type mask may also be used.

The projection optical system PL is one that projects the pattern image of the mask M to a substrate P at a prescribed projection magnification, and it has a plurality of optical elements, and the respective optical elements are held by a lens barrel PK. The projection optical system PL of the present embodiment is a reduction system whose projection magnification is, for example, ¼, ⅕, ⅛, etc., and a reduced image of the mask pattern is formed in a projection region AR that is conjugate with the aforementioned illumination region. Note that the projection optical system PL may be any of a reduction system, a magnification system or an enlargement system. In addition, the projection optical system PL may also be any of a refracting system that does not include a reflecting optical element, a reflecting system that does not include a refracting optical element, or a catadioptric system that includes both a reflecting optical element and a refracting optical element. In addition, the projection optical system PL may form either an inverted image or an erect image.

The substrate stage 4 has a substrate holder 4H, which holds the substrate P, and it is able to move in the directions of the six degrees of freedom of the X axis, the Y axis, the Z axis and the θX, θY and θZ directions on the base member BP, in a status in which the substrate P is held by the substrate holder 4H, by means of the driving of a substrate stage drive apparatus 4D that includes an actuator such as a linear motor. The substrate holder 4H is arranged at a concave part 4R provided on the substrate stage 4, and the upper surface 4F other than the concave part 4R of the substrate stage 4 is a flat surface that becomes nearly the same height (flush) as the surface of the substrate P held by the substrate holder 4H. This is because a portion of the liquid immersion region LR sticks out from the surface of the substrate P and is formed on the upper surface 4F, for example during the operation of exposure of the substrate P. The same height surface 4F of the substrate stage 4 that is nearly the same height as surface of the substrate P can be limited only a portion of the substrate stage 4, for example, only a prescribed region that includes the substrate P (including the range in which the liquid immersion region LR sticks out). In addition, if it is possible to continue to fill the optical path space K of the image plane side of the projection optical system PL with the liquid LQ (that is, it is possible to hold the liquid immersion region LR well), a level difference between surface of the substrate P held by the substrate holder 4H and the upper surface 4F of the substrate stage 4 can be acceptable. In addition, the substrate holder 4H may be formed as a unit with a portion of the substrate stage 4, but in the present embodiment, the substrate holder 4H and the substrate stage 4 are separately configured, and, for example, the substrate holder 4H is secured to the concave part 4R by vacuum suction, etc.

Position information of the substrate stage 4 (and, in turn, substrate P) is measured by a laser interferometer 4L. The laser interferometer 4L uses a movable mirror 4K provided on the substrate stage 4 to measure position information relating to the X axis, Y axis and θZ directions of the substrate stage 4. In addition, the surface position information of the surface of the substrate P held by the substrate stage 4 (position information relating to the Z axis, θX and θY directions) is detected by a focus/leveling detection system that is not shown in the drawing. The control apparatus 7 drives the substrate stage drive apparatus 4D and performs positional control of the substrate P held by the substrate stage 4 based on the detection results of the laser inteferometer 4L and the detection results of the focus/leveling detection system.

Note that the laser interferometer 4L may be such that it is able to measure both the position in the Z axis direction an the θX and θY direction rotation information of the substrate stage 4, and details thereof are disclosed in, for example, Published Japanese Translation No. 2001-510577 (corresponds to PCT International Publication WO 1999/28790). In addition, instead of securing a movable mirror 4K on the substrate stage 4, for example, a reflecting surface formed by mirror processing a portion (such as the side surface) of the substrate stage 4 may also be used.

In addition, the focus/leveling detection system is one which detects inclination information (rotation angle) of the substrate P in the θX and θY directions by measuring the respective position information of the substrate P in the Z axis direction at a plurality of measuring points thereof, but this plurality of measuring points is such that at least a portion thereof may be set within the liquid immersion region LR (or the projection region AR), or all of them may be set outside the liquid immersion region LR. In addition, for example, when the laser interferometer 4L is able to measure position information of the substrate P in the Z axis, θX and θY directions, the focus/leveling detection system need not be provided so that, during the exposure operation of the substrate P, it becomes possible to measure the Z axis direction position information thereof, and, at least during the exposure operation, the measurement results of the laser interferometer 4L may be used to perform positional control of the substrate P relating to the Z axis, θX and θY directions.

Figure 4:
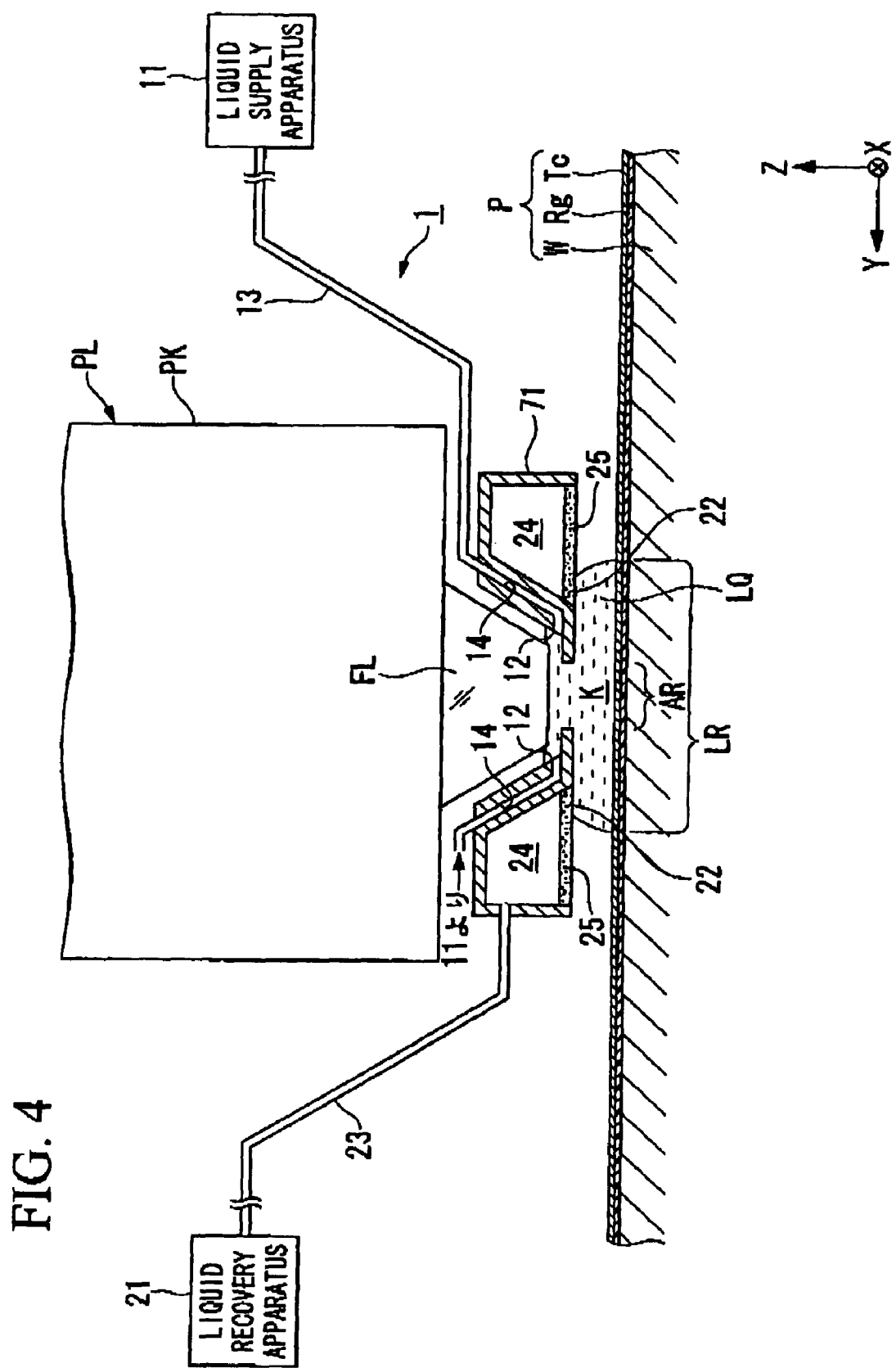
FIG. 4 is a drawing for explaining a liquid immersion system.

Next, the liquid immersion system 1 will be explained while referring to FIG. 4. FIG. 4 is an enlarged drawing that shows the principal portions of FIG. 3. The liquid immersion system 1 fills the optical path space K of the exposure light EL with a liquid LQ, the optical path space K is between final optical element FL and the substrate P arranged at a position that opposes that final optical element FL and held by the substrate holder 4H. The liquid immersion system 1 is provided in the vicinity of the optical path space K of the exposure light EL between the final optical element FL and the substrate P, and it comprises a nozzle member 71 that has a supply port 12 for supplying the liquid LQ to and a recovery port 22 for recovering the liquid LQ from that optical path space K, a supply pipe 13, a liquid supply apparatus 11 for supplying the liquid LQ to the supply port 12 via a supply flow path 14 formed in the interior of the nozzle member 71, and a liquid recovery apparatus 21 that recovers the liquid LQ recovered from the recovery port 22 of the nozzle member 71 via a recovery flow path 24 formed in the interior of the nozzle member 71 and a recovery pipe 23. The supply port 12 and the supply pipe 13 are connected via a supply flow path 14. The recovery port 22 and the supply pipe 23 are connected via a recovery flow path 24. In the present embodiment, the nozzle member 71 is annularly provided so that it encloses the optical path space K of the exposure light EL. The supply port 12 that supplies the liquid LQ is provided at the inner side surface of the nozzle member 71 that faces the optical path space K of the exposure light EL. The recovery port 22 that recovers the liquid LQ is provided at the lower surface of the nozzle member 71 that opposes the surface of the substrate P. In the present embodiment, a porous member (mesh) 25 is arranged on the recovery port 22.

The liquid supply apparatus 11 comprises a temperature regulation means, which regulates the temperature of the supplied liquid LQ, a degassing apparatus, which reduces the gas component in the liquid LQ, and a filter unit, which removes foreign matter in liquid LQ, and it is able to send out liquid LQ that is clean and has been temperature regulated. In addition, the liquid recovery apparatus 21 comprises a vacuum system, etc., and it is able to recover the liquid LQ. The operations of the liquid supply apparatus 11 and the liquid recovery apparatus 21 are controlled by the control apparatus 7. The liquid LQ that has been sent out from the liquid supply apparatus 11 is supplied to the optical path space K of the exposure light EL from the supply port 12 after it has flowed through supply pipe 13 and the supply flow path 14 of the nozzle member 71. In addition, the liquid LQ that has been recovered from the recovery port 22 by means of driving of the liquid recovery apparatus 21 is recovered by the liquid recovery apparatus 22 via the recovery pipe 23 after it has flowed through the recovery flow path 24 of the nozzle member 71. The control apparatus 7 controls the liquid immersion system 1 to perform the liquid supply operation resulting from the liquid supply apparatus 11 and the liquid recovery operation resulting from the liquid recovery apparatus 21 in parallel to fill the optical path K of the exposure light EL between the final optical element FL and the substrate P with the liquid LQ and locally form a liquid immersion region LR of the liquid LQ in a region of a portion on the substrate P.

Next, the method of exposing the substrate P using the exposure apparatus EX discussed above will be explained. Processing to use a first film Rg comprising a photosensitive material to cover (coat) the upper surface of the base material W is performed in the coating apparatus of the coater/developer apparatus CD. Then, prescribed processing that includes a process (edge rinse process) that removes the photosensitive material of the edge region or the side surface, etc. of the upper surface of the base material W using a solvent, for example, a baking process, etc. is implemented.

Next, processing to use a second film Tc, which is the topcoat film, to cover (coat) the first film Rg on the base material W is performed. In the aforementioned way, the second film Tc has a function of protecting the first film Rg, which comprises a photosensitive material formed onto the base material W, from the liquid LQ. Next, after the edge rinse process has been performed as necessary, the prescribed processing including a baking process is implemented.

After that, the substrate P is conveyed to the exposure apparatus EX by means of a prescribed conveyance apparatus. The exposure apparatus EX forms a liquid immersion region LR of the liquid LQ on the second film Tc of the substrate P and irradiates exposure light EL to the substrate P.

Figure 5:
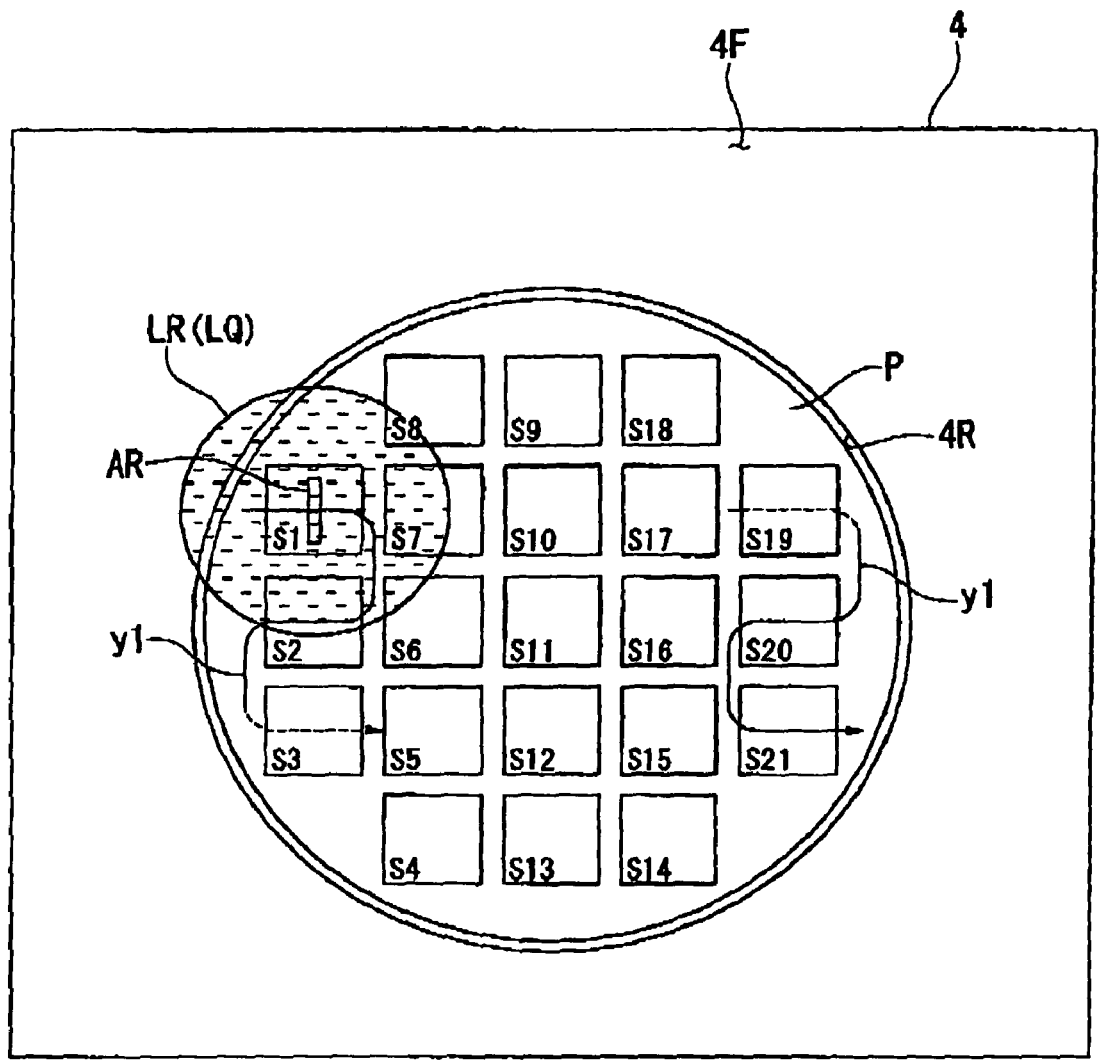
FIG. 5 is a drawing for explaining an example of the positional relationship between the liquid immersion region and the substrate stage that holds the substrate.

FIG. 5 is a drawing for explaining an example of the positional relationship between the liquid immersion region LR and the substrate stage 4 that holds the substrate P when the substrate P is exposed. As shown in FIG. 5, a plurality of shot regions S1~S21 are set up in a matrix shape on the substrate P. In the manner discussed above, the exposure apparatus EX of the first embodiment projection exposes the pattern of the mask M to the substrate P while moving the mask M and the substrate P in the Y axis direction (scanning direction). When the respective shot regions S1~S21 of the substrate P are exposed, the control apparatus 7 moves the projection region AR of the projection optical system PL and the liquid LQ liquid immersion region LR which covers the projection region AR relatively to the substrate P, as shown for example by arrow y1 in FIG. 5, and irradiates exposure light EL onto the substrate P via the liquid LQ of the liquid immersion region LR. The control apparatus 7 controls the operation of the substrate stage 4 so that the projection region AR (exposure light EL) of the projection optical system PL moves along arrow y1 on the substrate P. After exposure of one shot region has ended, the control apparatus 7 sequentially scan exposes the respective shot regions S1~S21 while step moving the substrate P (substrate stage 4) to move the next shot region to the exposure start position and thereafter moving substrate P by a step-and-scan method.

There is a possibility that exposure defects will occur on the exposed substrate P. Exposure defects include pattern defects formed on the substrate P by exposure. The causes of the occurrence of exposure defects (pattern defects) include at least one of abnormalities of the second film Tc formed on the surface of the substrate P and foreign matter (bubbles, particles) in the liquid LQ.

Abnormalities of the second film Tc include at least one of a status in which the liquid LQ has soaked into the second film Tc, a status in which foreign matter (bubbles, particles) is present in the interior of the second film Tc, and a status in which foreign matter (particles) has adhered to the second film Tc.

Figure 6:
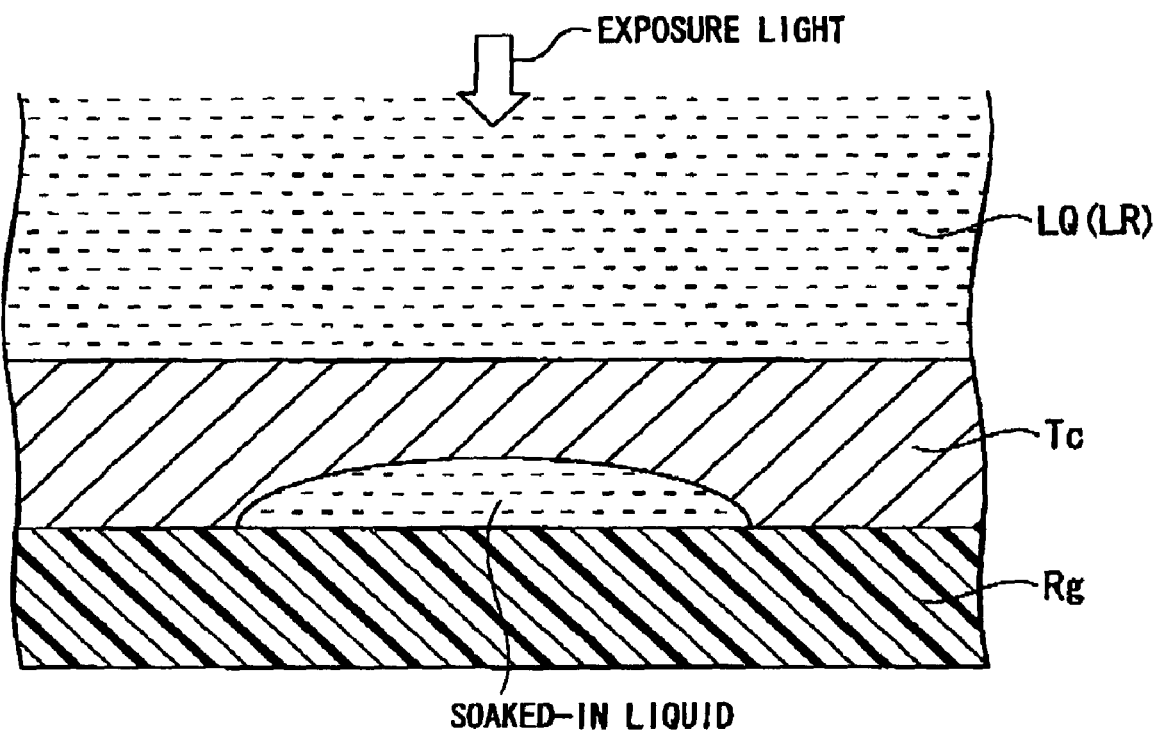
FIG. 6 is a schematic drawing for explaining an example of abnormality that has occurred in the film.

When liquid immersion exposure of the substrate P is performed, the liquid LQ of a liquid immersion region LR and the second film Tc formed on the surface of the substrate P come into contact, but, for example, as shown in the schematic drawing of FIG. 6, there is a possibility that the liquid LQ that has come into contact with the second film Tc on the substrate P will soak into (penetrate) the interior of the second film Tc. In the example shown in FIG. 6, the liquid LQ that has soaked into the interior of the second film Tc is present between the first film Rg and the second film Tc. In such a status, in the case where exposure light EL has been irradiated to the substrate P, there is a possibility that the exposure light EL irradiation status with respect to the first film Rg (or the base material W) will fluctuate due to the liquid LQ that has soaked in. Specifically, there is a possibility that the optical path of the exposure light EL will change at the interface between the second film Tc and the liquid that has soaked in. In the case where the optical path of the exposure light EL has changed at the interface of the second film Tc and the liquid that has soaked in, the exposure light EL will not reach the desired position of the first film Rg, and the desired pattern image will not be formed, so there is a possibility that exposure defects, such as defects occurring in the pattern formed on the base material W, will occur. In addition, at the interface of the second film Tc and the liquid LQ that has soaked into the interior of the second film Tc, there is a possibility that a nonconformity will occur in which a portion of the exposure light EL is reflected, and it becomes no longer possible to irradiate the first film Rg using exposure light EL having the prescribed quantity of light (intensity). In addition there is a possibility that the exposure light EL will be irregularly reflected by the liquid LQ that has soaked in.

Figure 7:
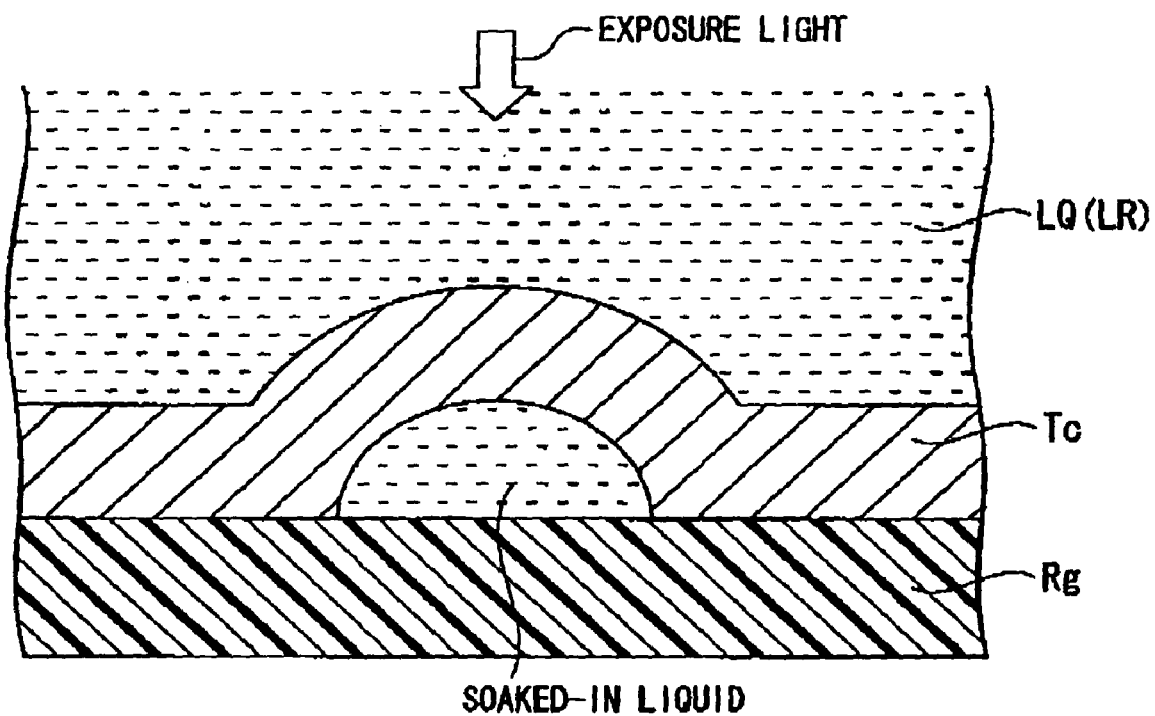
FIG. 7 is a schematic drawing for explaining an example of an abnormality that has occurred in the film.

In addition, as shown in the schematic drawing of FIG. 7, there is a possibility that, due to the liquid LQ that has soaked into the interior of the second film Tc, the second film Tc will swell, etc., and the shape of the second film Tc will change locally. In FIG. 7 as well, there is a possibility that exposure defects will occur, such as nonconformities such as the optical path of the exposure light EL changing occurring and defects occurring in the pattern formed on the base material W.

Figure 8:
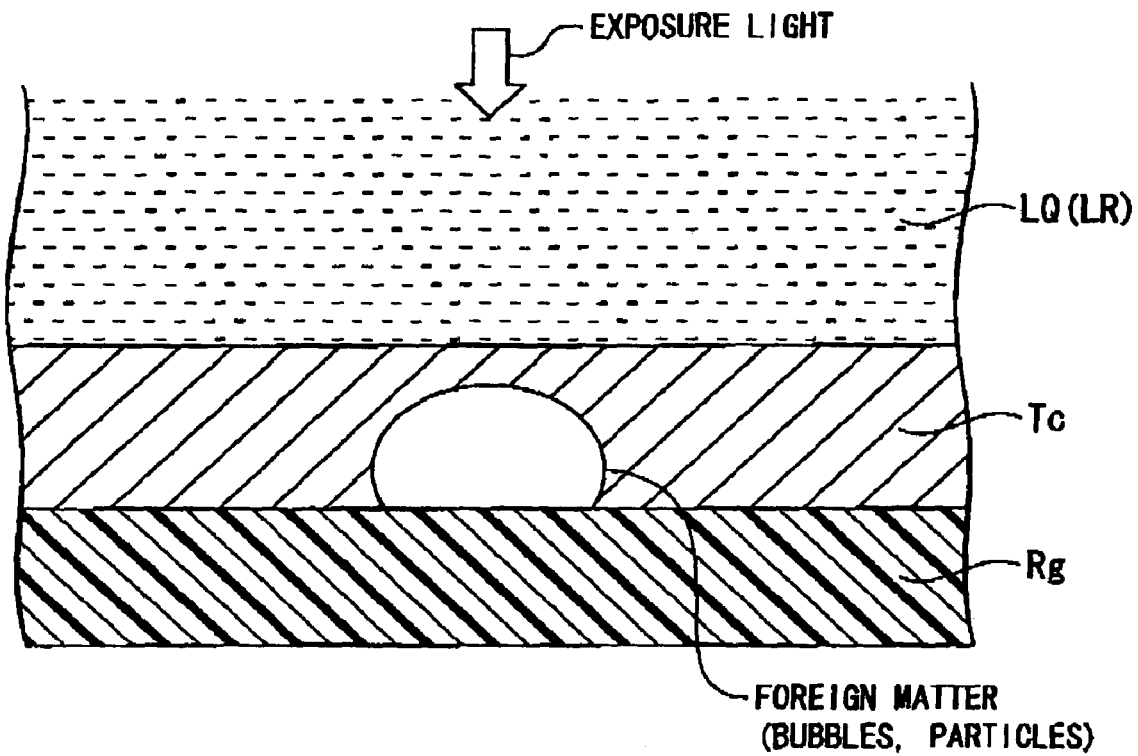
FIG. 8 is a schematic drawing for explaining an example of an abnormality that has occurred in the film.

In addition, as shown in the schematic drawing of FIG. 8, when foreign matter such as bubbles and particles is present in the interior of the second film Tc, there is a possibility that exposure defects will occur, such as nonconformities such as the optical path of the expose light EL changing occurring and defects occurring in the pattern formed on the base material W due to that foreign matter (bubbles, particles).

Figure 9:
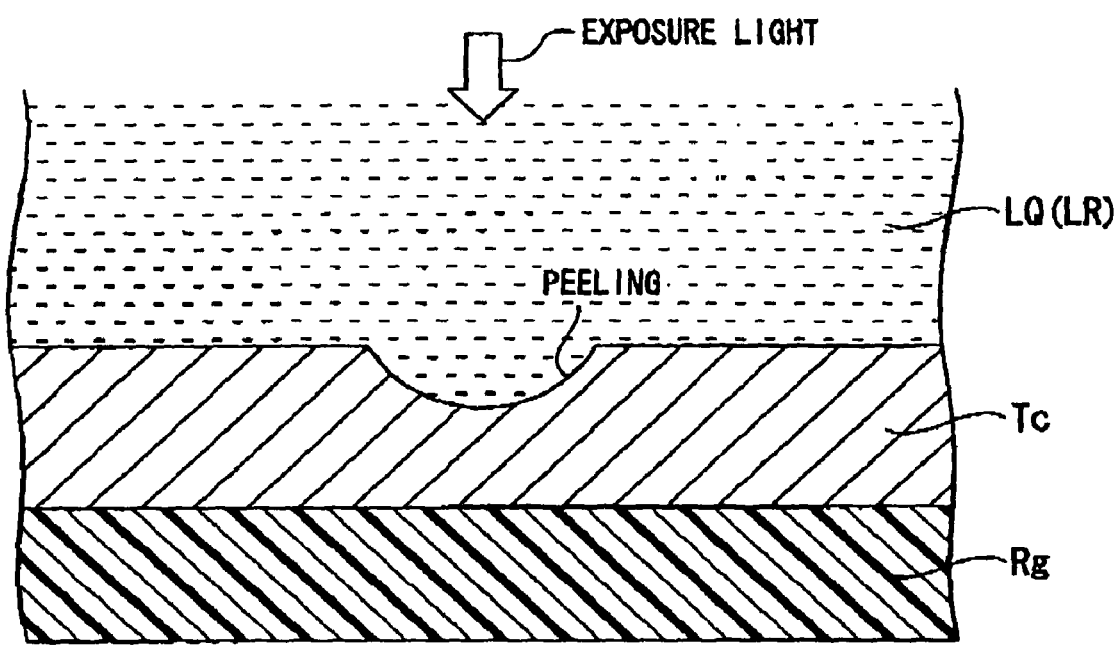
FIG. 9 is a schematic drawing for explaining an example of an abnormality that has occurred in the film.

In addition, as shown in the schematic drawing a FIG. 9, in the case where a portion of the second film Tc has peeled, there is a possibility that, due to that peeled portion, exposure defects will occur, such as nonconformities such as the optical path of the exposure light EL changing occurring and defects occurring in the pattern formed on the base material W.

Figure 10:
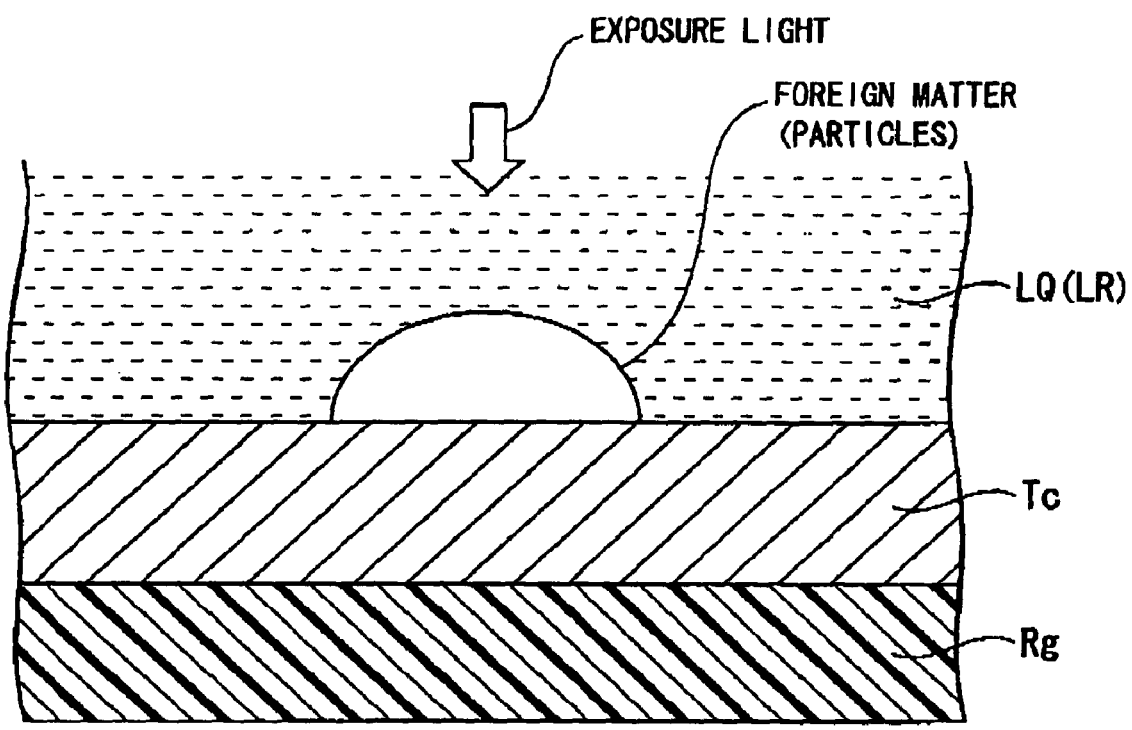
FIG. 10 is a schematic drawing for explaining an example of an abnormality that has occurred in the film.

In addition, as shown in the schematic drawing of FIG. 10, there is a possibility that, due to foreign matter such as particles that has adhered onto the second film Tc, exposure defects will occur, such as nonconformities such as the optical path of the exposure light EL changing occurring and defects occurring in the pattern formed on the base material W. Note that water marks may also be cited as an example of foreign matter adhering onto the second film Tc.

Figure 11:
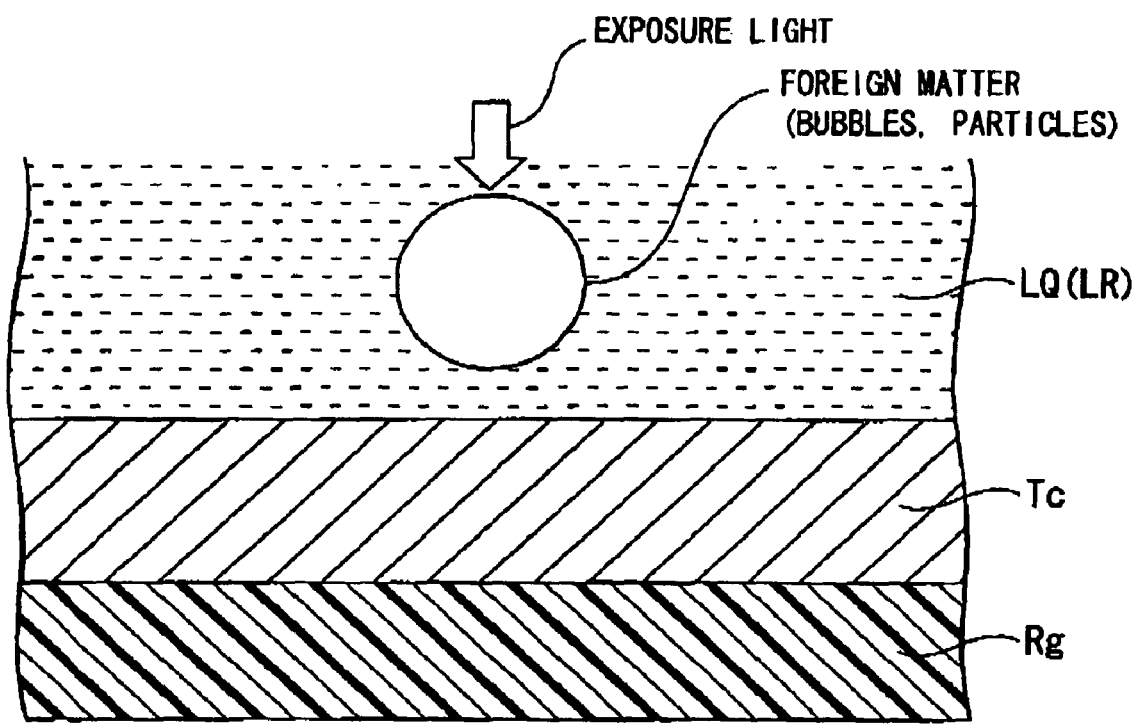
FIG. 11 is a schematic drawing for explaining an example of an abnormality that has occurred in the film.

In addition, as shown in the schematic drawing of FIG. 11, there is a possibility that, due to foreign matter such as bubbles and particles that is present in the liquid LQ of the liquid immersion region LR, exposure defects will occur, such as nonconformities such as the optical path of the exposure light EL changing occurring and defects occurring in the pattern formed on the base material W.

In the present embodiment, analysis of exposure defects of a substrate P exposed via a liquid LQ will be performed, and the causes of the exposure defects will be identified.

Figure 12:
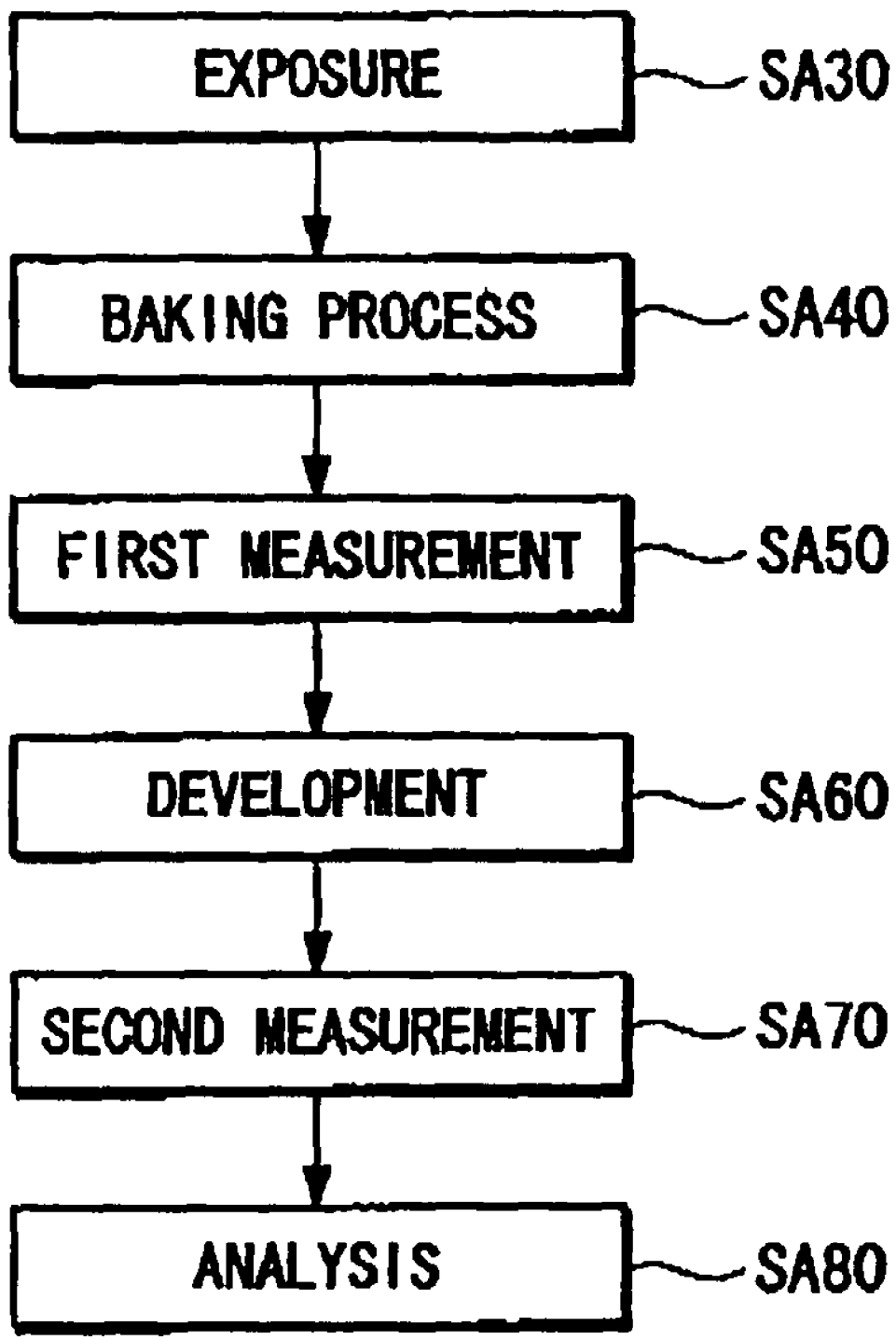
FIG. 12 is a flowchart for explaining an analysis method relating to the first embodiment.

The method of analyzing the exposure defects of the substrate P exposed via the liquid LQ will be explained while referring to the flowchart of FIG. 12.

After exposure processing (step SA30) of the substrate P via the liquid LQ has ended, a baking process (post-bake) is performed with respect to that substrate P (step SA40). Then, a first measuring process, which measures the abnormalities of the pre-development substrate P, is performed (step SA50).

In the first measuring process, abnormalities of the second film Tc of the post-exposure, pre-development substrate P are measured, and while the positions at which the abnormalities are occurring are being identified, the images (optical images) in the vicinity of the positions where those abnormalities are occurring are obtained using a prescribed measuring apparatus (defect inspection apparatus). Note that an apparatus described in the Prior Art and Embodiments of the Invention sections of Published Japanese Translation No. 2002-519667, for example, may be used as the measuring apparatus (defect inspection apparatus).

Figure 13:
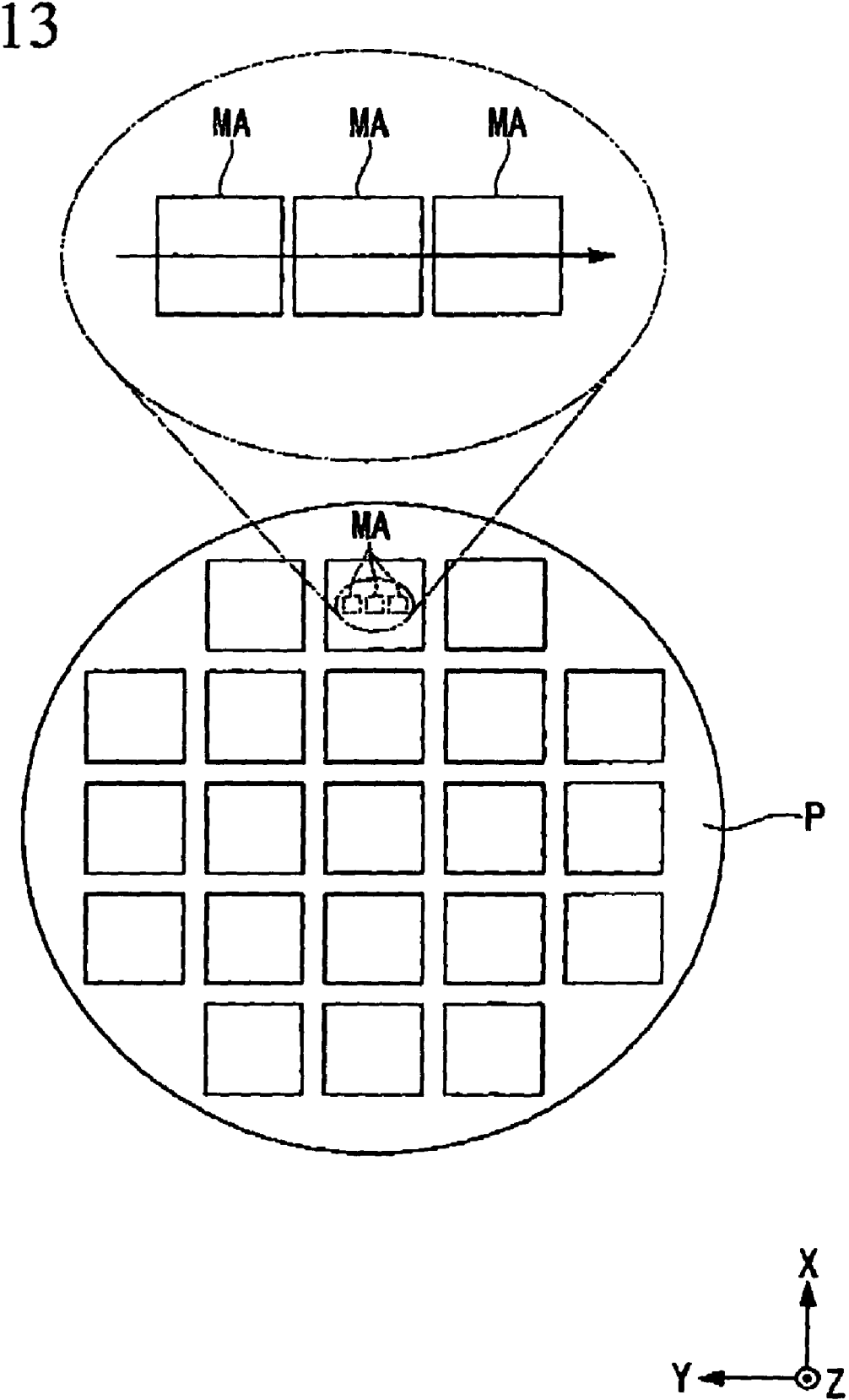
FIG. 13 is a drawing for explaining the measuring process that measures the abnormalities of the substrate.

FIG. 13 is a schematic drawing for explaining the operation of measuring abnormalities of a substrate P using a prescribed measuring apparatus. As shown in FIG. 13, a plurality of shot regions are arranged on the substrate P, and the measuring apparatus measures the abnormalities of the second film Tc on the pre-development substrate P. The measuring apparatus has a prescribed measuring area MA, and it obtains the image (optical image) of a substrate P surface (second film Tc) within the measuring area MA. In the present embodiment, the measuring apparatus sets up a coordinate system (XY coordinate system) on the surface of the substrate P, and it obtains the image (optical image) of the second film Tc at the respective positions of the coordinate system set up on the substrate P while relatively moving the measuring area MA and the substrate P. Then, the images within adjacent measuring areas MA, for example, are compared, and the positions of the second film Tc where abnormalities are occurring are identified based on those comparison results. The measuring apparatus measures nearly the entire range of the surface of the substrate P.

In addition, in the present embodiment, the images in the vicinity of the positions of the second film Tc on the substrate P where abnormalities are occurring identified by the measuring apparatus are obtained with even higher accuracy by a scanning electron microscope (SEM). The measuring apparatus outputs information on the positions where abnormalities are occurring on the second film Tc to the scanning electron microscope. The scanning electron microscope is able to obtain images in the vicinity of the positions where abnormalities are occurring with great efficiency based on position information output from the measuring apparatus.

After the first measuring process has ended, a developing process is performed with respect to that substrate P (step SA60). The substrate P undergoes a developing process in the developer apparatus of the coater/developer apparatus CD. Through this, while the second film Tc is removed, in the case where the first film Rg is a positive type resist, the portion where the exposure light EL is irradiated is removed. Note that in the case where the first film Rg is a negative type resist, the portion where the exposure light EL is irradiated remains. The pattern (wiring pattern) is formed on the substrate P (base material W) by performing the prescribed process, such as an etching process, on the substrate P.

Next, a second measuring process which measures the abnormalities of the post-development substrate P is performed (step SA70). In the second measuring process, abnormalities of nearly the entire range on the substrate P (base material W) are measured using the measuring apparatus (defect position apparatus) discussed above. The measuring apparatus identifies the positions of the substrate P (base material W) where abnormalities (pattern defects, exposure defects) are occurring. In addition, the scanning electron microscope (SEM) obtains images in the vicinity of the positions of the substrate P (base material W) where abnormalities are occurring.

Next, an analyzing process which analyzes exposure defects of the substrate P exposed via the liquid LQ is performed based on the measurement results of the first measuring process and the measurement results of the second measuring process (step SA80). In the analyzing process, identification of the causes of exposure defects (pattern defects) is performed based on the measurement results of the first measuring process and the measurement results of the second measuring process.

In the analyzing process of the present embodiment, discrimination is performed as to whether the cause of the exposure defects (pattern defect) is abnormalities of the second film Tc or foreign matter in the liquid LQ.

Figure 14A:
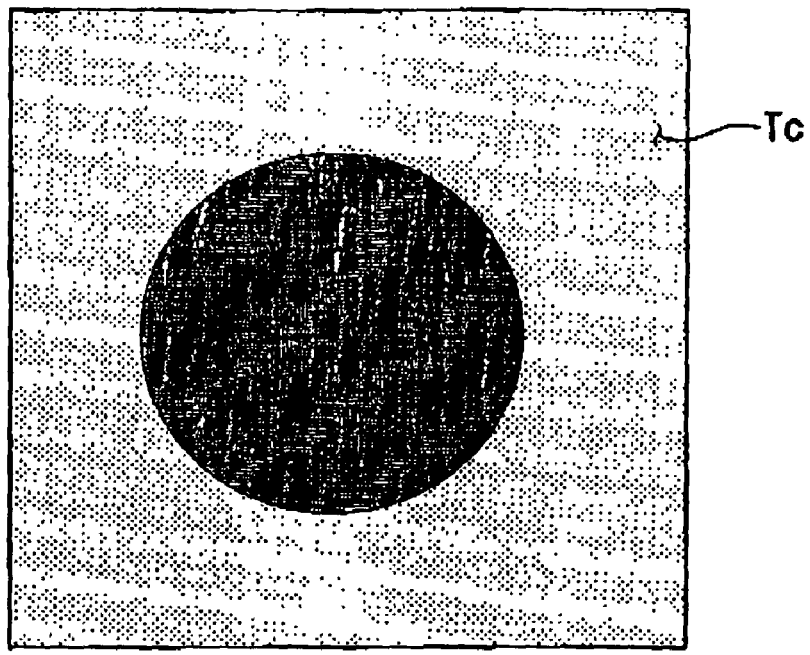
FIG. 14A is a drawing that shows an example of an optical image obtained by means of the measuring process.

For example, in the case where abnormalities have occurred in the second film Tc, such as a status as that shown in FIG. 6 and FIG. 7 in which the liquid LQ has soaked into the interior of the second film Tc, a status such as that shown in FIG. 8 in which foreign matter (bubbles, particles) is present in the interior of the second film Tc, a status such as that shown in FIG. 9 in which a portion of the second film Tc has peeled, or a status such as that shown in FIG. 10 in which foreign matter (particles) has adhered to the second film Tc, in the first measure process, which measures the pre-development substrate P, an image such as that shown in FIG. 14A, for example, is obtained as the image in the vicinity of the positions of the substrate P (second film Tc) where the abnormalities are occurring.

Note that, in the present embodiment, the measuring apparatus obtains the second film Tc as an image, so it is possible to determine if any of a status such as that shown in FIG. 6 and FIG. 7 in which the liquid LQ has soaked in, a status such as that shown in FIG. 8 in which foreign matter is present in the interior of the second film Tc, a status such as that shown in FIG. 9 in which a portion of the second film Tc has peeled, or a status such as that shown in FIG. 10 in which foreign matter has adhered to the second film Tc is occurring.

Figure 14B:
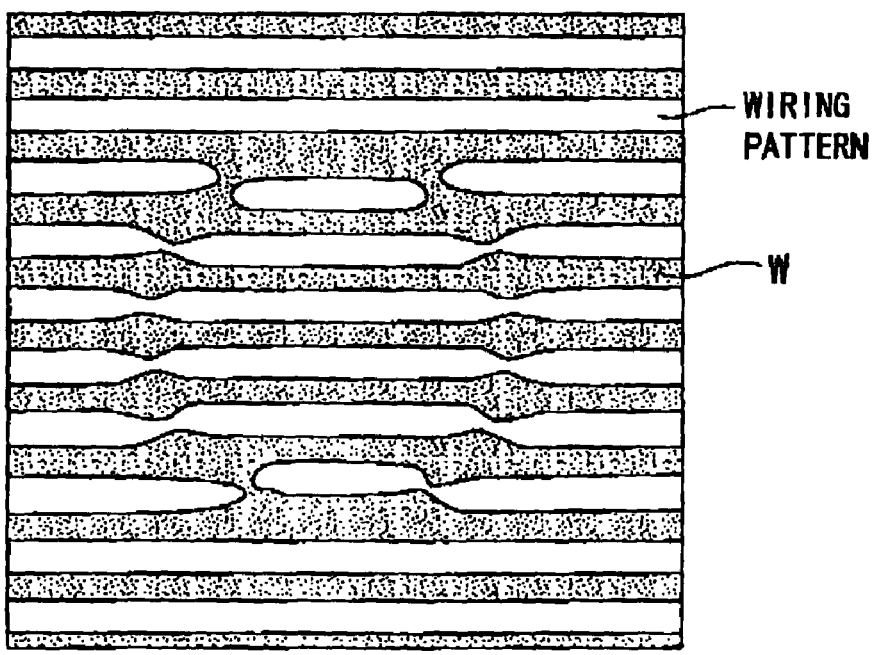
FIG. 14B is a drawing that shows an example of an optical image obtained by means of the measuring process.

In the second measuring process, which measures the post-development substrate P, in the case where an image such as that shown in FIG. 14B is obtained as the image in the vicinity of positions corresponding to positions of the substrate P (base material W) where abnormalities of the second film Tc are occurring, it is possible to determine that pattern defects (exposure defects) have occurred in the substrate P (base material W) attributable to abnormalities of the second film Tc. Shown in FIG. 14B is an image of a status in which a pattern defects resulting in a portion of the wiring pattern formed on the substrate P (base material W) shorting or the line widths thereof becoming non-uniform are occurring.

In this way, in the case where there are abnormalities in the prescribed position of the pre-development substrate P (second film Tc) and there are abnormalities (pattern defects) at positions corresponding to positions of the post-development substrate P (base material W) where abnormalities of the second film Tc are occurring, the causes of the pattern defects (exposure defects) of that substrate P can be determined to be abnormalities of the second film Tc.

Figure 15A:
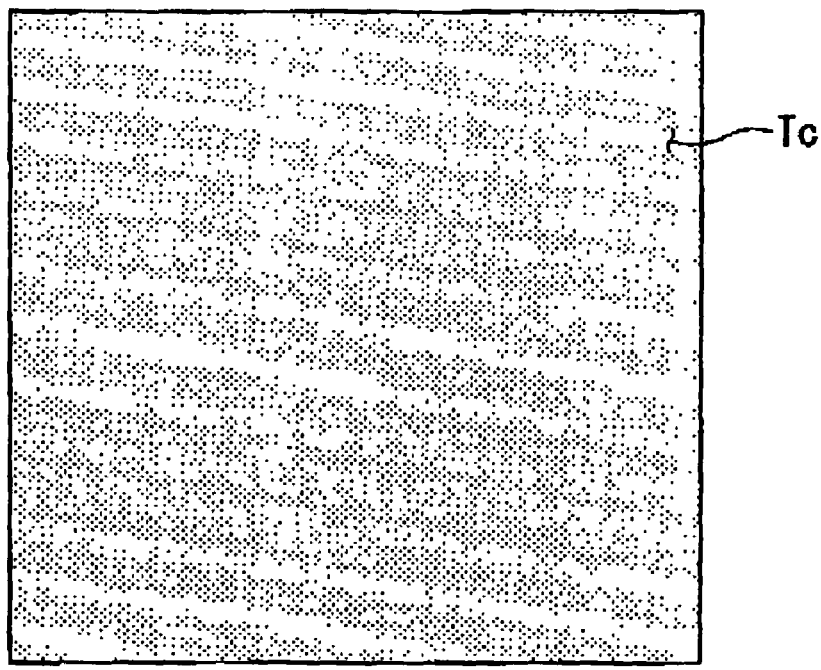
FIG. 15A is a drawing that shows an example of an optical image obtained by means of the measuring process.
Figure 15B:
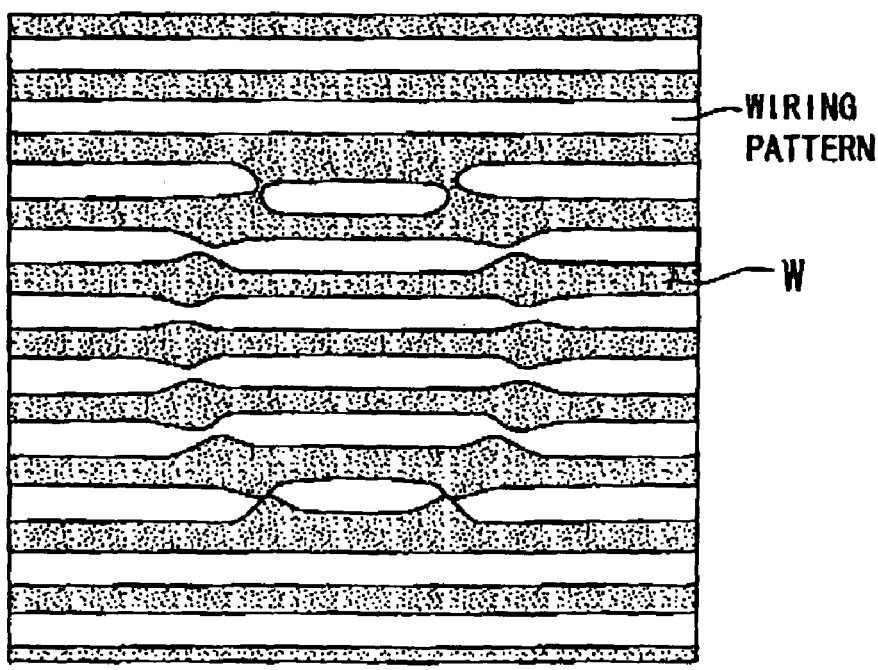
FIG. 15B is a drawing that shows an example of an optical image obtained by means of the measuring process.

On the other hand, in the case where, as shown in FIG. 15A, there are no abnormalities in the pre-development substrate P (second film Tc) and, as shown in FIG. 15B, there are abnormalities (pattern defects) in the post-development substrate P (base material W), the causes of those pattern defects (exposure defects) of the substrate P can be determined to be foreign matter (bubbles, particles) in the liquid LQ. Since foreign matter in the liquid LQ does not affect the second film Tc and is not measured in the first measuring process, in the case where there are no abnormalities in the pre-development substrate P (second film Tc) and there are pattern defects at the prescribed positions of the post-development substrate P (base material W), the causes of those pattern defects (exposure defects) of the substrate P can be determined to be foreign matter in the liquid LQ.

As explained above, it is possible to determine whether the exposure defects (pattern defects) have occurred due to abnormalities of the second film Tc or have occurred due to abnormalities other than abnormalities of the second film Tc based on the measurement results of having measured abnormalities of the pre-development substrate P exposed via the liquid LQ and the measurement results of having measured abnormalities of the post-development substrate P. And in the case where abnormalities of the substrate P (second film Tc) have been detected in the first measuring process, it is possible to determine that the cause of the exposure defects (pattern defects) is abnormalities of the second film Tc, and in the case where abnormalities have not been detected in the first measuring process and abnormalities (pattern defects) of the substrate P (base material W) have been detected by the second measuring process, it is possible to determine that the cause of the exposure defects (pattern defects) is foreign matter in the liquid LQ.

The control apparatus 7 is able to set the exposure conditions based on the analysis results and expose the substrate P based on the set exposure conditions. The exposure conditions include at least one of the liquid immersion conditions when the optical path space K of the exposure light EL has been filled with the liquid LQ and the movement conditions of the substrate P with respect to the optical path space K. The liquid immersion conditions include at least one of the supply conditions when the liquid LQ for filling the optical path space K of the exposure light EL is supplied and the recovery conditions when the liquid LQ is recovered. In addition, the movement conditions of the substrate P include at least one of the movement velocity, acceleration (deceleration), movement direction (movement trajectory), and the distance of movement when movement in a single prescribed direction is performed.

For example, in the case where the cause of the exposure defects (pattern defects) is determined to be foreign matter (bubbles) in the liquid LQ, in order to control the generation of bubbles in the liquid LQ, the control apparatus 7, for example, adjusts the liquid immersion conditions when the optical path space K of the exposure light EL is filled with the liquid LQ or adjusts the movement conditions of the substrate P with respect to the optical path space K that has been filled with the liquid LQ. Specifically, for example, in order to control the generation of bubbles in the liquid LQ that forms the liquid immersion region LR, the degassing capability of the degassing apparatus of the liquid supply apparatus 11 is increased or the liquid supply amount per unit time supplied to the optical path space K from the supply port 12 is adjusted. Or, in order to control the generation of bubbles in the liquid LQ that forms the liquid immersion region LR, the liquid recovery amount per unit time via the recovery port 22 may also be adjusted. In addition, it is also possible to control the generation of bubbles in the liquid LQ that forms the liquid immersion region LR by adjusting the movement velocity or the acceleration, etc. of the substrate P with respect to the liquid LQ of the liquid immersion region LR. In addition, it is also possible to control the generation of bubbles in the liquid LQ that forms the liquid immersion region LR by adjusting the contact angle between the liquid contact surface (that is, second film Tc) of the substrate P and the liquid LQ.

In addition, in the case where it has been determined that the cause of the exposure defects (pattern defects) is abnormalities of the second film Tc, for example, it is possible to take appropriate measures such as reselecting the material of the second film Tc or adjusting coating conditions when the second film Tc is coated using the coating apparatus. In addition, it is possible to perform, for example, adjustment of the time of contact between the second film Tc and the liquid LQ by adjusting the liquid immersion conditions discussed above or the movement conditions of the substrate P to control the occurrence of abnormalities of the second film Tc.

Second Embodiment

Figure 16:
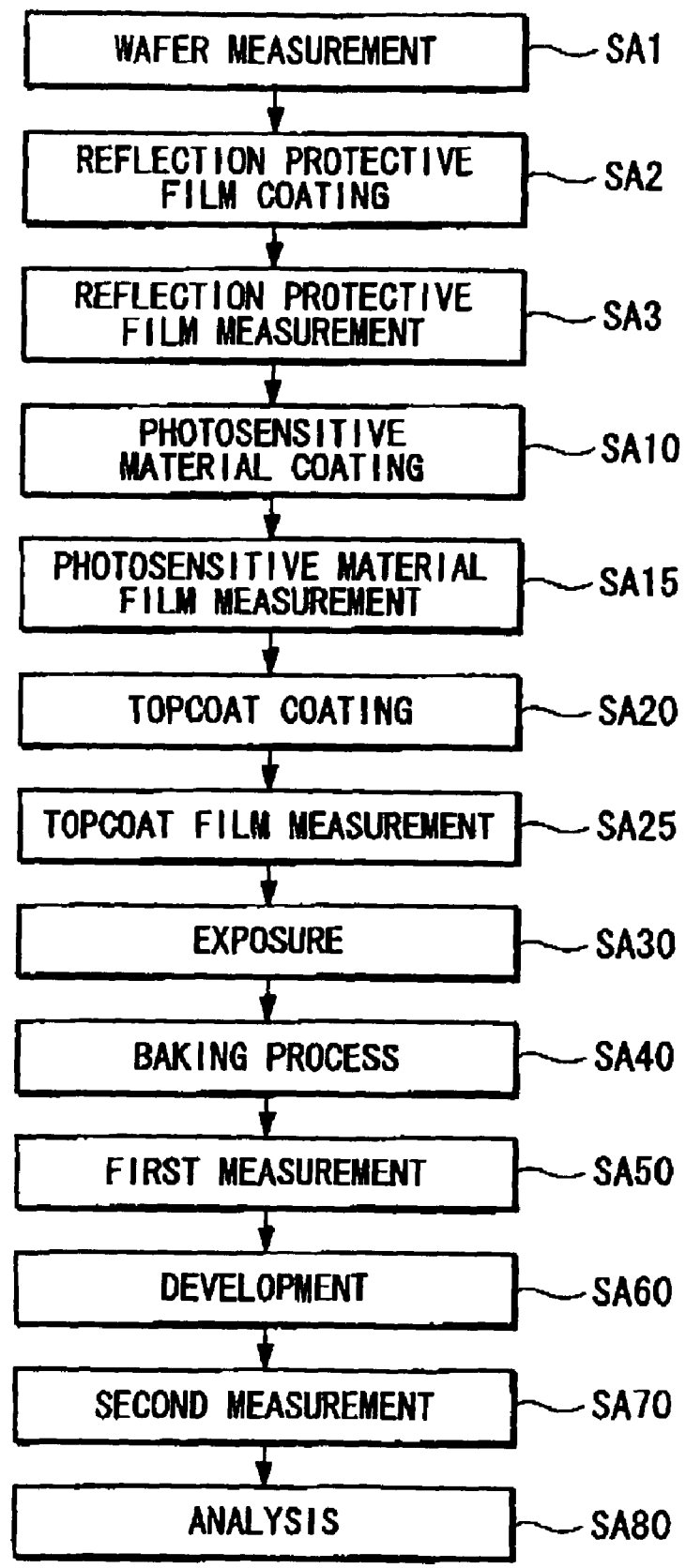
FIG. 16 is a flowchart for explaining an analysis method relating to the second embodiment.

Next, the second embodiment will be explained while referring to the flowchart of FIG. 16. In the following explanation, the same reference symbols will be assigned to portions with configurations identical or equivalent to the first embodiment discussed above, and an explanation thereof will be abbreviated or omitted.

In the first embodiment discussed above, abnormalities of the post-exposure substrate P are measured, but, in the second embodiment, measurement of abnormalities of the pre-exposure substrate P is added. Specifically, in FIG. 16, first, abnormalities of the pre-exposure base material (wafer) W are measured using a measuring apparatus (defect inspection apparatus) discussed above (step SA1). Next, for example, reflection preventing film is coated onto the base material W (step SA2), and the abnormalities of that reflection preventing film are measured (step SA3). Then, the first film Rg comprising a photosensitive material is coated onto the reflection preventing film (step SA10), and the abnormalities of that first film Rg are measured (step SA15). Then, the second film Tc, which is the topcoat film, is coated onto the first film Rg (step SA20), and abnormalities of that second film Tc are measured (step SA25). Then, exposure of the substrate P (step SA30), a post-baking process with respect to the post-exposure substrate (step SA40), a first measuring process (step SA50), development (step SA60), a second measuring process (step SA70) and an analyzing process (step SA80) are sequentially performed.

In this way, it is possible to measure the presence or absence of abnormalities of the respective films coated onto not only the post-exposure but the pre-exposure substrate P and to more clearly identify causes of exposure defects (pattern defects) based on the measurement results thereof, the measurement results of the first measuring process, and the second measurement results.

Note that, in the first and second embodiments discussed above, in the case where abnormalities have been detected in the first measuring process, which measures the pre-development substrate P, and abnormalities have also been detected in the second measuring process, which measures the post-development substrate P, the causes of the exposure defects are determined to be abnormalities of the second film Tc. In addition, in the first and second embodiments, in the case where abnormalities have not been detected by the first measuring process, which measures the pre-development substrate P, and abnormalities have been detected by the second measuring process, which measures the post-development substrate P, the causes of the exposure defects are determined to be foreign matter in the liquid LQ. However, in the first and second embodiments, there is a possibility that conditions will occur in which abnormalities are detected in the first measuring process, which measures the pre-development substrate P, and abnormalities are not detected in the second measuring process, which measures the post-development substrate P. For example, in FIG. 5, when a liquid immersion region LR is formed on the first shot region S1, for example, from among the plurality of shot regions S1~S21 set on the substrate P, and the first shot region S1 is exposed via the liquid LQ of that liquid immersion region LR, and when there were no abnormalities in the second film Tc of the first shot region S1 but the other shot regions (for example, shot regions S2, S6, S7, S8, etc. adjacent to the first shot region S1) are being exposed, there is a possibility that the liquid LQ of the liquid immersion region LR that covers those other shot regions will come into contact with the first shot region S1. In that case, the second film Tc of the first shot region S1 comes into contact with the liquid LQ for a long period of time, and, as shown in FIG. 6 and FIG. 7, there is a possibility that the liquid LQ will soak into the interior of the second film Tc. Specifically, when exposure light EL is being irradiated to the first shot region S1, there are no abnormalities in the second film Tc of that first shot region S1, and the first shot region S1 is exposed well without producing exposure defects, but after exposure has ended there is a possibility that abnormalities will occur in the second film Tc of that first shot region S1. If such a status has occurred, in the first measuring process, abnormalities of the second film Tc of the first shot region S1 are detected, but, in the second measuring process, abnormalities of the base material W of the first shot region S1 are not detected. It is possible to determine that penetration (soaking in) of the liquid LQ will not occur in such a case where, in relation to the second film Tc, the time in contact with the liquid LQ is a prescribed time or less, and that penetration (soaking in) of the liquid LQ will occur in the case where the time in contact with the liquid is a prescribed time or more. Therefore, it is possible to set the exposure conditions and perform reselection of the second film Tc while taking into account that prescribed time.

Note that, in the respective embodiments discussed above, in the first measuring process and the second measuring process, while measuring abnormalities of the substrate P using the measuring apparatus (defect inspection apparatus), positions where those abnormalities are occurring are specified, and images in the vicinity of those positions are obtained with even higher accuracy by the scanning electron microscope, but if it is possible to measure abnormalities of the substrate P, it will be possible to employ any configurations without there necessarily being a need to use a scanning electron microscope.

Note that, in the respective embodiments discussed above, the substrate P has a second film (topcoat film) that covers the first film Rg comprising a photosensitive material formed onto the base material W, but it is also possible to have a configuration in which a second film Tc is not provided. In that case, abnormalities of the first film Rg on the pre-development substrate P would be measured by the first measuring process, and abnormalities of the post-development substrate P would be measured by the second measuring process.

Third Embodiment

Next, the third embodiment will be explained. The special characteristic of the present embodiment is that the question of whether the uppermost layer of film of the substrate P (the second film Tc or the first film Rg) is a film with few exposure defects (pattern defects) is decided based on the receding contact angle $\theta_R$ of the liquid LQ at the surface of the substrate P.

Figure 17:
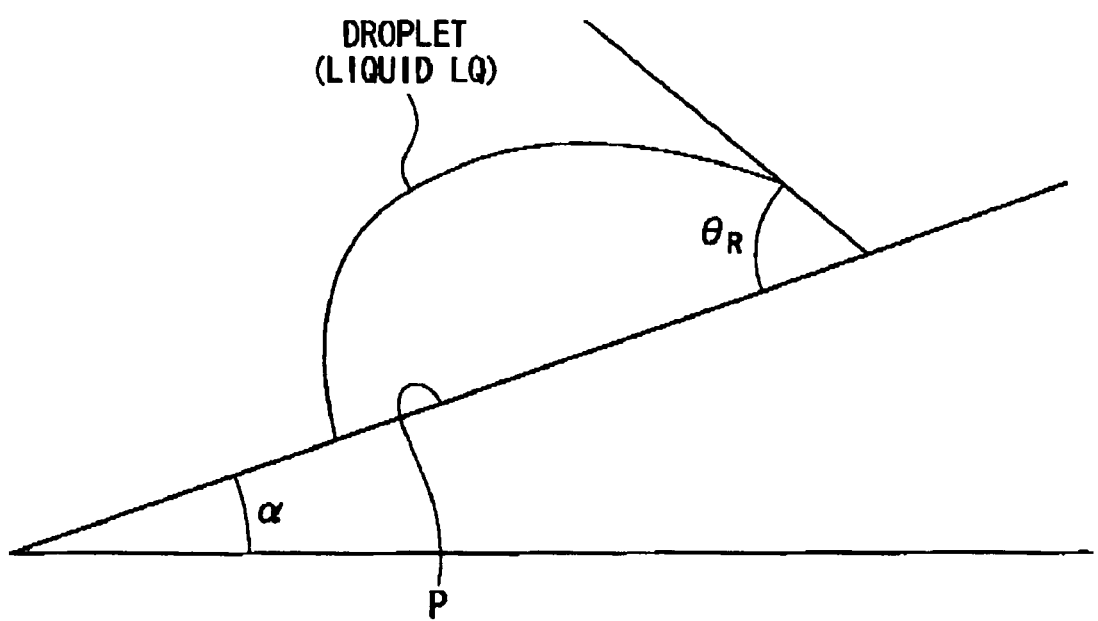
FIG. 17 is a drawing for explaining the receding contact angle relating to the third embodiment.

The receding contact angle $\theta_R$ will be explained while referring to schematic drawing of FIG. 17. The receding contact angle $\theta_R$, in a status in which a droplet of liquid LQ has adhered to surface of an object (here, the surface of the substrate P), refers to the contact angle of the rear side of the droplet when the surface of that object has been tilted with respect to the horizontal plane and when the droplet of liquid LQ that has adhered to the surface of the object has started off (started movement) downward due to gravitational action. In other words, the receding contact angle $\theta_R$ refers to the contact angle of the rear side of the droplet at the critical angle of the slide off angle $\alpha$ at which that droplet slides off when the surface of the object to which a droplet of liquid LQ has adhere is tilted. Note that when the droplet of liquid LQ that has adhered to the surface of the object starts off downward (starts movement) due to gravitational action refers to the instant when the droplet starts movement, but it may also be at least one status from among that immediately before movement is started and that immediately after movement is started. Note that the receding contact angle $\theta_R$ can be easily measured using a well-known measuring apparatus.

The inventors of the present application have discovered that, when liquid immersion exposure of a plurality of substrates P which respectively have films of different materials formed on their uppermost layers was performed and the defects (exposure defects) of the pattern of the substrate P were analyzed and the defect level (including at least one of the defect density and the number of defects) was inspected using the methods explained in the first embodiment and the second embodiment, the defect level varies according to the receding contact angle $\theta_R$ of the liquid LQ at the surface of the substrate P. More specifically, the inventors of the present application have discovered that the defect level drops the larger the receding contact angle $\theta_R$ of the liquid LQ at the surface of the substrate P.

Figure 18:
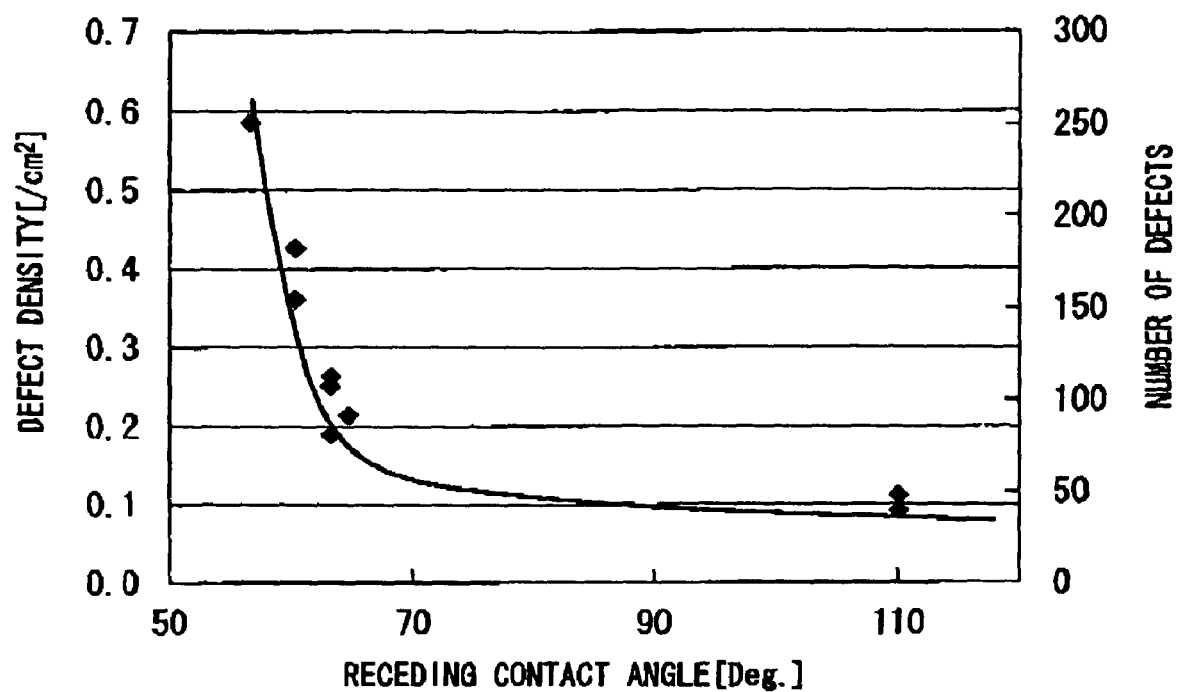
FIG. 18 is a drawing that shows the relationship between the receding contact angle of the liquid at the substrate surface and the defect level.

FIG. 18 is a drawing that shows an example of the relationship between the receding contact angle $\theta_R$ of the liquid LQ at the surface of the substrate P and the defect level and, more specifically, the relationship between the receding contact angle $\theta_R$, the defect density and the number of defects. Shown in FIG. 18 are points that correspond to the inspection results of the respective substrate P discussed above and an approximation curve into which the respective inspection results have been fit. As shown in FIG. 18, the defect density and the number of defects both decrease the larger the receding contact angle $\theta_R$.

Therefore, if the information (approximation curve, etc.) that shows the relationship between the receding contact angle and the defect level as shown in FIG. 18 is prepared in advance, merely by measuring the receding contact angle $\theta_R$ on the film of the uppermost layer of the exposed substrate P, it is possible to estimate the defect level (defect density, number of defects, etc.) after liquid immersion exposure of the substrate P, and it is possible to determine whether or not it is a film appropriate for device pattern formation using the liquid immersion exposure method without implementing methods such as those discussed above in the first embodiment and the second embodiment. Through FIG. 18, it is known that it is desirable to use a film whose receding contact angle $\theta_R$ is approximately 70 degrees or more for example.

In addition, the receding contact angle $\theta_R$ may be used as an indicator of the selection of the film of the uppermost layer of the substrate P. For example, by measuring the receding contact angles $\theta_R$ of a plurality of types of films, it is possible to pick out from among these a number of films that have been estimated to have few exposure defects (pattern defects). Therefore, it is possible to perform a detailed investigation (liquid immersion exposure and defect inspection, etc.) only on those picked out films to select the optimal films. In this way, it is possible to efficiently select optimal films that are not likely to produce exposure defects (pattern defects) without performing a detailed investigation (liquid immersion exposure and defect inspection, etc.) on all of the types of film.

In addition, the exposure conditions of the substrate P may be determined based on the receding contact angle $\theta_R$ on the film of the uppermost layer of the substrate P. For example, included in the exposure conditions are the movement conditions and/or the liquid immersion conditions (including at least one of the supply amount and the recovery amount of the liquid LQ) of the substrate P. For example, in a case where exposure defect (pattern defects) are reduced by changing the velocity of the substrate P, it is possible to set the movement velocity during scanning exposure of the substrate P according to the receding contact angle $\theta_R$ so that exposure defects (pattern defects) are reduced. Note that not only the movement velocity of the substrate P but at least one of the acceleration, deceleration, and movement direction of the substrate P may also be varied according to the receding contact angle $\theta_R$ of the substrate P so that exposure defects (pattern defects) are reduced. In addition, in the case where exposure defects (pattern defects) are reduced by varying the supply amount (and/or the recovery amount) of the liquid LQ, the supply amount (and/or the recovery amount) of the liquid LQ may also be set according to the receding contact angle $\theta_R$ so that exposure defects (pattern defects) are reduced.

In the aforementioned respective embodiments, pure water is used as the liquid LQ. Pure water has advantages in that it can be easily obtained in large quantity at semiconductor fabrication plants, etc. and in that it has no adverse effects on the photoresist on the substrate P or on the optical elements (lenses), etc. In addition, pure water has no adverse effects on the environment and contains very few impurities, so one can also expect an action whereby the surface of the substrate P and the surface of the optical element provided on the front end surface of the projection optical system PL are cleaned. Note that, in the case where the purity of the pure water supplied from the plant, etc. is low, the exposure apparatus may also be provided with an ultrapure water manufacturing apparatus.

In addition, the index of refraction n of pure water (water) with respect to exposure light EL with a wavelength of approximately 193 nm is nearly 1.44, so in the case where ArF excimer laser light (193 nm wavelength) is used as the light source of the exposure light EL, on the substrate P, it is possible to shorten the wavelength to 1/n, that is, approximately 134 nm, to obtain high resolution. Also, the depth of focus is expanded by approximately n times, that is approximately 1.44 times, compared with it being in air, so in the case where it would be permissible to ensure the same level of depth of focus as the case in which it is used in air, it is possible to further increase the numerical aperture of the projection optical system PL, and resolution improves on this point as well.

In the respective embodiments above, an optical element FL is attached to the front end of the projection optical system PL, and this optical element may also be used to perform adjustment of the optical characteristics of the projection optical system PL, for example, aberration (spherical aberration, coma aberration, etc.). Note that the optical element attached to the front end of the projection optical element PL may also be an optical plate used in adjustment of the optical characteristics of the projection optical system PL. Or, it may be a parallel flat surface plate (cover glass, etc.) that is able to transmit exposure light EL.

Note that, in the case where the pressure between the substrate P and the optical element of the front end of the projection optical system PL produced by the flow of the liquid LQ is large, that optical element is not made replaceable, but the optical element is fixed securely by that pressure so that it does not move.

In addition, in the above respective embodiments, the configuration is such that the space between the projection optical system PL and the surface of the substrate P is filled with a liquid LQ, but it may be, for example, a configuration in which liquid LQ is filled in a status in which a cover glass consisting of a parallel flat plate is attached to the surface of the substrate P.

In addition, in the above respective embodiments, the optical path space of the image plane side of the optical element of the front end of the projection optical system is filled with a liquid, but it is also possible to employ a projection optical system in which the optical path space of the object plane side of the front end optical element is also filled with a liquid as in the PCT International Publication WO 2004/019128.

Note that the liquid LQ of the above respective embodiments is water, but it may be a liquid other than water, and, for example, if the light source of the exposure light EL is an $F_2$ laser, this $F_2$ laser light does not pass through water, so the liquid LQ may be a fluorine group liquid, for example, a fluorocarbon oil or a perfluoropolyether (PFPE), that is able to transmit $F_2$ laser light. In such a case, lyophilic treatment is performed on the portion that comes into contact with the liquid LQ by, for example, forming a thin film using a substance with a molecular structure with small polarity including fluorine for example. In addition, it is also possible to use a liquid LQ (for example, cedar oil) that is transparent with respect to the exposure light EL, has as high a refractive index as possible, and that is stable with to the photoresist coated onto the surface of the substrate P and the projection optical system PL.

In addition, a liquid LQ whose refractive index is approximately 1.6~1.8 may be used. Also, the optical element FL may be formed using a material whose refractive index is higher (for example, 1.6 or more) than those of quartz or fluorite.

Note that, applicable as the substrate P of the above respective embodiments are not only a semiconductor wafer for the manufacture of semiconductor devices but glass substrates for display devices, ceramic wafers for thin film magnetic heads, or mask or reticle base plates, etc. (synthetic quart, silicon wafer) used in exposure apparatuses.

Applicable as the exposure apparatus EX are, in addition to step and scan system scanning exposure apparatuses (scanning steppers) that synchronously move the mask M and the substrate P to scan expose the pattern of the mask M, step and repeat system projection exposure apparatuses (steppers) that full-field expose the pattern of the mask M in a status in which the mask M and the substrate P have been made stationary and sequentially step move the substrate P.

In addition, for the exposure apparatus EX, also possible is application to an exposure apparatus of a system that full-field exposes a reduced image of the first pattern onto the substrate P using a projection optical system (for example, a refracting type projection optical system that does not include a reflecting element, at a ⅛ reduction magnification ratio) in a status in which the first pattern and the substrate P have been made nearly stationary. In this case, after this, also possible is application to a stitch system full field exposure apparatus that full-field exposes the reduced image of the second pattern onto a substrate P to be partially superposed with the first pattern using that projection optical system in a status in which the second pattern and the substrate P have been made nearly stationary. In addition, for the stitch system exposure apparatus, also possible is application to a step and stitch system exposure apparatus that partially superposes and transfers at least two patterns on the substrate P and sequentially moves the substrate P.

In addition, in the above respective embodiments, the examples explained were of exposure apparatuses comprising a projection optical system PL, but the present invention may also be applied to exposure apparatuses and exposure methods that do not use a projection optical system PL. Even in the case in which a projection optical system is not used, exposure light is irradiated to a substrate via an optical member such as a mask or lens, and a liquid immersion region is formed in the prescribed space between such an optical member and the substrate.

In addition, the preset invention can also be applied to a twin-stage type exposure apparatus comprising a plurality of substrate stages such as those disclosed in, for example, Japanese Unexamined Patent Application, Publication No. H10-163099, Japanese Unexamined Patent Application, Publication No. H10-214783 (corresponds to U.S. Pat. No. 6,590,634), Published Japanese Translation No. 2000-505958 (corresponds to U.S. Pat. No. 5,969,441) and U.S. Pat. No. 6,208,407.

In addition, as is disclosed in Japanese Unexamined Patent Application, Publication No. H11-1354300 (corresponds to PCT International Publication WO 1999/23692) and Japanese Unexamined Patent Application, Publication No. 2000-164504 (corresponds to U.S. Pat. No. 6,897,963), it is also possible to apply the present invention to an exposure apparatus that comprises a substrate stage, which holds a substrate, and a measurement stage, on which a reference member on which a reference mark is formed and a variety of optical sensors are mounted.

In addition, in the embodiments discussed above, an exposure apparatus that locally fills the liquid between the projection optical system PL and the substrate P is employed, but the present invention may also be applied to a liquid immersion exposure apparatus that performs exposure in a status in which the entire surface of the substrate subject to exposure is immersed in liquid as disclosed in, for example, Japanese Unexamined Patent Application, Publication No. H06-124873, Japanese Unexamined Patent Application, Publication No. H10-303114 and U.S. Pat. No. 5,825,043.

The types of exposure apparatuses EX are not limited to exposure apparatuses for semiconductor device fabrication that expose a semiconductor device pattern onto a substrate P but are also widely applicable to exposure apparatuses for the manufacture of liquid crystal display elements and for the manufacture of displays, and exposure apparatuses for the manufacture of thin film magnetic heads, image pickup elements (CCDs), micro machines, MEMS, DNA chips or reticles or acids.

Note that, in the above respective embodiments, a light transmitting type mask in which a prescribed light shielding pattern (or phase pattern/light reduction pattern) has been formed on a light transmissive substrate is used, but, instead of this mask, an electronic mask (includes, for example, a DMD (digital micro-mirror device), also called a variable shape mask, for example, a type of non-light transmissive image display element (spatial light modulator)) that forms a transmission pattern or a reflection pattern or a light emission pattern based on electronic data of the pattern to be exposed may be used as disclosed in U.S. Pat. No. 6,778,257.

In addition, it is also possible to apply the present invention to a exposure apparatus (lithography system) that exposes a line and space pattern onto a substrate P by forming interference fringes on the substrate P as disclosed in the PCT International Publication WO 2001/035168.

In addition, it is also possible to apply the preset invention to an exposure apparatus that synthesizes two mask patterns on a substrate via a projection optical system and nearly synchronously double exposes one-shot region on the substrate by means of a single scanning exposure as disclosed in, for example, Published Japanese Translation No. 2004-519850 (corresponds to U.S. Pat. No. 6,611,316).

Note that, insofar as permitted by the laws of the country designated or selected in this international application, the disclosures of all publications relating to exposure apparatuses cited in the above respective embodiments and modification examples and the disclosures the U.S. patents will be invoked and be made part of the description of this text.

In the above way, the exposure apparatus EX of the present embodiment is manufactured by assembling various subsystems, including the respective constituent elements presented in the Scope of Patents Claims of the present application, so that the prescribed mechanical precision, electrical precision and optical precision are maintained. To ensure these respective precisions, performed before and after this assembly are adjustment for achieving optical precision with respect to the various optical systems, adjustments for achieving mechanical precision with respect to the various mechanical systems, and adjustments for achieving electrical precision with respect to the various electrical systems. The process of assembly from the various to the exposure apparatus includes mechanical connections, electrical circuit wiring connections, air pressure circuit piping connections, etc. among the various subsystem. Obviously, before the process of assembly from these various subsystems to the exposure apparatus there are the processes of individual assembly of the respective subsystems. When the process of assembly of the various subsystems into the exposure apparatus has ended, overall adjustment is performed, and the various precisions are ensured for the exposure apparatus as a whole.

Note that it is preferable that the manufacture of the exposure apparatus be performed in a clean room in which the temperature, the degree of cleanliness, etc. are controlled.

Figure 19:
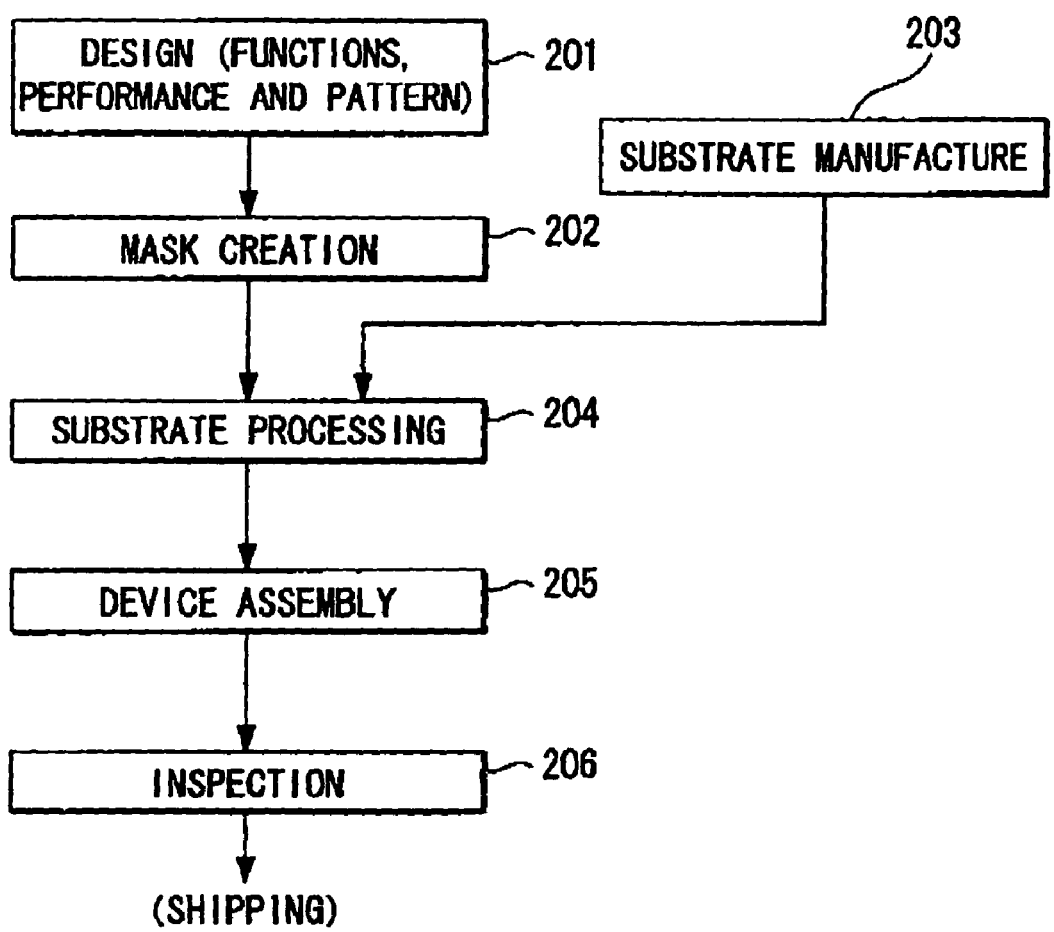
FIG. 19 is a flowchart for explaining an example of the microdevice manufacturing process.

As shown in FIG. 19, microdevices such as semiconductor devices are manufactured by going through a step 201 that performs microdevice function and performance design, a step 202 that creates a mask (reticle) based on this design step, a step 203 that manufactures a substrate that is the device base material, a step 204 that includes a substrate processing process such as a process that exposes the pattern of the mask on the substrate by means of an exposure apparatus EX of an embodiment discussed above, a process that develops the exposed substrate, and processes for heating (curing) and etching the developed substrate, a device assembly step (including a dicing process, bonding process and packaging process) 205, and an inspection step 206, etc.

According to the present invention, it is possible to accurately analyze the exposure defects of a substrate exposed via a liquid, and it is possible to expose a substrate well using the analysis results thereof. Therefore, it is possible to manufacture a device that has the desired performance.

What is claimed is:

1. An analysis method for analyzing an exposure defect of a substrate exposed via a liquid, the method comprising:
   a first measuring process, which measures an abnormality of the substrate after the substrate is exposed via the liquid and before the substrate is developed;
   a second measuring process, which measures an abnormality of the substrate after the substrate has been developed, and
   an analyzing process, which analyzes an exposure defect of the substrate based on a comparison of a measurement result of the first measuring process and a measurement result of the second measuring process,
   wherein the exposure via the liquid, which causes exposure defects, is executed prior to the first measuring process and the second measuring process.

2. An analysis method according to claim 1, wherein the exposure defect includes a pattern defect formed on the substrate by the exposure.

3. An analysis method according to claim 1, wherein in the analyzing process, a cause of the exposure defect is identified.

4. An analysis method according to claim 3, wherein
   a prescribed film is formed on a surface of the substrate, and
   in the analyzing process, a determination is made as to whether the cause of the exposure defect relates to an abnormality of the film.

5. An analysis method according to claim 4, wherein the film includes a protective film that protects a film of a photosensitive material formed on the substrate from the liquid.

6. An analysis method according to claim 4, wherein the abnormality of the film includes at least one of a status in which liquid has soaked into the film and a status in which foreign matter has adhered to the film.

7. An analysis method according to claim 3, wherein, in the analyzing process, a determination is made as to whether the cause of the exposure defect relates to foreign matter in the liquid.

8. An analysis method according to claim 7, wherein the foreign matter includes bubbles.

9. An exposure method, comprising:
   exposing a substrate via a liquid; and
   analyzing a status of the substrate by means of an analysis method according to claim 1.

10. An exposure method according to claim 9, further comprising a process that sets the exposure conditions based on the analysis results.

11. A device manufacturing method that uses an exposure method according to claim 9.

12. An analysis method for analyzing an exposure defect of a substrate exposed via a liquid, the method comprising:
   a measuring process, which measures and images an abnormality of the substrate after the substrate has been developed, and
   an analyzing process, which analyzes an exposure defect of the substrate based on a comparison of an imaged result of the measuring process and an image obtained after exposure of the substrate via the liquid and prior to the development of the substrate, wherein the exposure via the liquid, which causes the exposure defect, is executed prior to the measuring process.

13. An exposure method that exposes a substrate via a liquid, the method comprising:
   obtaining a relationship between a receding contact angle of the liquid on a film that forms an uppermost layer of the substrate prior to exposure of the substrate and a defect level of the substrate after the substrate has been exposed, the defect level being defined by at least one of a defect density and a number of defects on the substrate;
   exposing the substrate using the obtained relationship; and
   setting a movement velocity of the substrate during exposure according to the receding contact angle to reduce exposure defects.

14. An exposure method that exposes a substrate via a liquid, the method comprising:
   obtaining a relationship between a receding contact angle of the liquid on a film that forms an uppermost layer of the substrate prior to exposure of the substrate and a defect level of the substrate after the substrate has been exposed, the defect level being defined by at least one of a defect density and a number of defects on the substrate;
   exposing the substrate using the obtained relationship; and
   varying one of an acceleration or movement direction of the substrate during exposure according to the receding contact angle to reduce exposure defects.

15. An exposure method that exposes a substrate via a liquid, the method comprising:
   obtaining a relationship between a receding contact angle of the liquid on a film that forms an uppermost layer of the substrate prior to exposure of the substrate and a defect level of the substrate after the substrate has been exposed, the defect level being defined by at least one of a defect density and a number of defects on the substrate;
   exposing the substrate using the obtained relationship; and
   varying a supply amount of the liquid during exposure according to the receding contact angle to reduce exposure defects.

16. The exposure method of claim 13, the relationship indicating that the defect level decreases as the receding contact angle increases.

* * * * *